(12) United States Patent
Ahn

(10) Patent No.: US 12,170,043 B2
(45) Date of Patent: Dec. 17, 2024

(54) METHOD AND DEVICE FOR CONTROLLING LUMINANCE OF AUGMENTED REALITY (AR) IMAGE

(71) Applicant: SAMSUNG ELECTRONICS CO., LTD., Suwon-si (KR)

(72) Inventor: Sohmin Ahn, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 59 days.

(21) Appl. No.: 17/963,669

(22) Filed: Oct. 11, 2022

(65) Prior Publication Data
US 2023/0154368 A1    May 18, 2023

Related U.S. Application Data

(63) Continuation of application No. PCT/KR2022/013116, filed on Sep. 1, 2022.

(30) Foreign Application Priority Data

Nov. 12, 2021    (KR) .................. 10-2021-0155477

(51) Int. Cl.
*G09G 5/02* (2006.01)
*G06T 11/00* (2006.01)
*G09G 3/20* (2006.01)

(52) U.S. Cl.
CPC ............... *G09G 3/20* (2013.01); *G06T 11/00* (2013.01); *G09G 2320/0626* (2013.01);
(Continued)

(58) Field of Classification Search
CPC .... G09G 5/02; G09G 5/06; G09G 2320/0666; G09G 2340/06; G09G 3/20;
(Continued)

(56) References Cited

U.S. PATENT DOCUMENTS 9,097,891 B2    8/2015    Border et al.
9,341,843 B2    5/2016    Border et al.
(Continued)

FOREIGN PATENT DOCUMENTS

KR    1020170036710 A    4/2017
KR    10-2019-0108086 A    9/2019
(Continued)

OTHER PUBLICATIONS

Purcher, Jack, "Apple Invents Augmented Reality Glasses using Photochromic Lenses", Patently Apple, Oct. 24, 2019, ttps://www.patentlyapple.com/2019/10/apple-invents-augmented-reality-glasses-using-photochromic-lenses.html. (10 pages total).
(Continued)

*Primary Examiner* — Gordon G Liu
(74) *Attorney, Agent, or Firm* — Sughrue Mion, PLLC

(57) ABSTRACT

An electronic device includes a memory configured to store computer-executable instructions, a processor configured to execute the computer-executable instructions by accessing the memory, and a communicator configured to receive luminance information comprising a maximum luminance and a luminance setting value from at least one target device among one or more external devices identified by the electronic device. The processor is configured to determine a luminance value of the at least one target device, based on the luminance information received from the at least one target device. The processor is further configured to determine a luminance value of an AR image associated with the at least one target device, based on the luminance value of the at least one target device.

20 Claims, 22 Drawing Sheets

(52) U.S. Cl.
CPC ............... *G09G 2330/021* (2013.01); *G09G 2354/00* (2013.01); *G09G 2360/144* (2013.01); *G09G 2360/16* (2013.01)

(58) Field of Classification Search
CPC ..... G09G 2320/0626; G09G 2360/144; G09G 2360/16; G09T 11/001; G06F 2200/1614; G06F 2200/1637; G06T 11/001; G06T 11/20; G06T 11/40; G06T 11/60; G06T 11/00
USPC ........................................................ 345/589
See application file for complete search history.

(56) References Cited

U.S. PATENT DOCUMENTS

| | | | |
|---|---|---|---|
| 9,418,479 | B1 | 8/2016 | Worley, III et al. |
| 9,448,404 | B2 | 9/2016 | Pandey et al. |
| 9,558,541 | B2 | 1/2017 | Kim et al. |
| 10,235,788 | B2 | 3/2019 | Tinsman |
| 10,923,018 | B2 | 2/2021 | Leem et al. |
| 2018/0176483 | A1 | 6/2018 | Knorr et al. |
| 2019/0156402 | A1 | 5/2019 | Greenberger et al. |
| 2021/0020141 | A1* | 1/2021 | Yuasa .................... G06F 3/012 |
| 2021/0329316 | A1* | 10/2021 | Ninan .............. H04N 21/44218 |
| 2022/0101803 | A1* | 3/2022 | Ohba ................... G09G 3/3406 |

FOREIGN PATENT DOCUMENTS

| | | |
|---|---|---|
| KR | 1020200031666 A | 3/2020 |
| KR | 1020200097408 A | 8/2020 |
| WO | 2019/046334 A1 | 3/2019 |
| WO | 2019181153 A1 | 9/2019 |

OTHER PUBLICATIONS

Sean, "Apple Glass might feature lenses that adjust to ambient lighting", Gizmochina, Dec. 21, 2020, https://www.gizmochina.com/2020/12/21/apple-glass-lenses-adjust-to-ambient-lighting/. (3 pages total).

International Search Report (PCT/ISA/210) dated Nov. 30, 2022 issued by the International Searching Authority in International Application No. PCT/KR2022/013116.

Communication dated Jul. 26, 2024 issued by the European Patent Office in European Patent Application No. 22/892,992.

* cited by examiner

METHOD AND DEVICE FOR CONTROLLING LUMINANCE OF AUGMENTED REALITY (AR) IMAGE

CROSS-REFERENCE TO RELATED APPLICATIONS

This application is a continuation application of International Application No. PCT/KR2022/013116, designating the United States, filed on Sep. 1, 2022, in the Korean Intellectual Property Receiving Office, which claims priority to Korean Patent Application No. 10-2021-0155477, filed on Nov. 12, 2021, in the Korean Intellectual Property Office, the disclosures of which are incorporated by reference herein in their entireties.

BACKGROUND

1. Field

The disclosure relates to augmented reality (AR), and more particularly, to a method and device for controlling a luminance of an AR image displayed on a wearable AR device.

2. Description of Related Art

In the related art, the luminance of an AR image displayed on an electronic device may be adjusted based on the ambient luminance of the electronic device to provide visual comfort to a user. However, if the electronic device adjusts the luminance of the AR image based on the ambient luminance of the electronic device, a difference between the luminance of the AR image and the luminance of an image output from a target device may occur. When two images viewed by a user wearing the electronic device have different luminance, the user may sense the visual difference due to pupil adjustment for the luminance as the eyes move between the two images and may suffer from eye strain when viewing the two images for a long time. As a result, the user may be inconvenienced in having to readjust the luminance of the AR image displayed on the electronic device.

SUMMARY

According to an aspect of the disclosure, an electronic device includes a memory configured to store computer-executable instructions, a processor configured to execute the computer-executable instructions by accessing the memory, and a communicator configured to receive luminance information comprising a maximum luminance and a luminance setting value from at least one target device among one or more external devices identified by the electronic device. The processor is configured to determine a luminance value of the at least one target device, based on the luminance information received from the at least one target device, and to determine a luminance value of an augmented reality (AR) image associated with the at least one target device, based on the luminance value of the at least one target device.

The processor may be further configured to adjust a mask opacity of an AR area displaying the AR image associated with the at least one target device, based on the determined luminance value of the AR image associated with the target device.

The processor may be further configured to determine a luminance limit of the at least one target device by using the luminance information received from the at least one target device, and to determine the luminance value of the at least one target device, based on the luminance limit of the at least one target device and light transmittance of the electronic device.

The processor may be further configured to adjust the mask opacity of the AR area displaying the AR image associated with the at least one target device, based on a ratio of the luminance value of the AR image associated with the at least one target device to the maximum luminance of the electronic device.

The processor may be further configured to adjust a mask opacity of a background area excluding an AR area displaying the AR image associated with the at least one target device from a total area of a screen of the electronic device, based on a ratio of an ambient illuminance value of the electronic device to the maximum luminance of the electronic device.

The processor may be further configured, when the luminance value of the AR image associated with the at least one target device exceeds the maximum luminance of the electronic device, to modify the luminance value of the AR image associated with the at least one target device to the maximum luminance of the electronic device. In some embodiments, the processor may be further configured, when the luminance value of the AR image associated with the at least one target device is equal to or less than the maximum luminance of the electronic device, to maintain the luminance value of the AR image associated with the at least one target device.

The processor may be further configured to determine a modified luminance value of the at least one target device by receiving modified luminance information from the at least one target device, and to modify the luminance value of the AR image associated with the at least one target device, based on the modified luminance value of the at least one target device.

The electronic device may be further include a database configured to store results obtained by mapping spatial information and ambient illuminance values with candidate luminance values. In such embodiments, the processor may be further configured, when the electronic device fails to receive the luminance information from another target device except for the at least one target device from among the one or more external devices, to extract, from the database, a candidate luminance value of the another target device, based on spatial information of the another target device and the ambient illuminance value of the electronic device, and to determine a luminance value of another AR image associated with the another target device, based on the candidate luminance value of the another target device.

The processor may be further configured, when the electronic device fails to receive the luminance information from another target device except for the at least one target device from among the one or more external devices, to receive a setting value for the luminance value of another AR image associated with the another target device, and to determine the luminance value of the another AR image associated with the another target device, based on the received setting value.

The processor may be further configured to display the another AR image associated with the another target device side-by-side with an image of the another target device, and to adjust a mask opacity of a peripheral area such that a luminance value of the peripheral area, excluding a first area displaying the image of the another target device and a second area displaying the another AR image associated with the another target device from a total area of a screen, is equal to or less than a threshold luminance value.

The processor may be further configured, when the electronic device enters a fine setting mode, to load a setting image, and to display, on a screen of the electronic device, the loaded setting image on a same area as an area visualizing an image of a target device in an overlapping manner.

According to an aspect of the present disclosure, a method performed by an electronic device includes receiving luminance information comprising a maximum luminance and a luminance setting value from at least one target device from among one or more external devices identified by the electronic device. The method further includes determining a luminance value of the at least one target device, based on the luminance information received from the at least one target device. The method further includes determining a luminance value of an AR image associated with the at least one target device, based on the luminance value of the at least one target device.

The method may further include adjusting a mask opacity of an AR area displaying the AR image associated with the at least one target device, based on the determined luminance value of the AR image associated with the at least one target device.

The determing of the luminance value of the at least one target device may include determining a luminance limit of the at least one target device by using the luminance information received from the at least one target device, and determining the luminance value of the at least one target device, based on the luminance limit of the at least one target device and light transmittance of the electronic device.

The adjusting of the mask opacity of the AR area may include adjusting the mask opacity of the AR area displaying the AR image associated with the at least one target device, based on a ratio of the luminance value of the AR image associated with the at least one target device to a maximum luminance of the electronic device.

The determining of the luminance value of the AR image may include, when the luminance value of the AR image associated with the at least one target device exceeds a maximum luminance of the electronic device, modifying the luminance value of the AR image associated with the at least one target device to the maximum luminance of the electronic device, and, when the luminance value of the AR image associated with the at least one target device is equal to or less than the maximum luminance of the electronic device, maintaining the luminance value of the AR image associated with the at least one target device.

The method may further include storing results obtained by mapping spatial information and an ambient illuminance values with candidate luminance values in a database, and, when the electronic device fails to receive luminance information from another target device except for the at least one target device from among the one or more external devices, extracting, from the database, a candidate luminance value of the another target device, based on spatial information of the another target device and the ambient illuminance value of the electronic device, and determining a luminance value of another AR image associated with the another target device, based on the candidate luminance value of the another target device.

The method may further include, when the electronic device fails to receive luminance information from another target device except for the at least one target device from among the one or more external devices, receiving, from a user, a setting value for a luminance value of another AR image associated with the another target device, and determining the luminance value of the another AR image associated with the another target device, based on the received setting value.

The receiving of the setting value may include displaying the another AR image associated with the another target device side-by-side with an image of the another target device, and adjusting a mask opacity of a peripheral area such that a luminance value of the peripheral area, excluding a first area displaying the image of the another target device and a second area displaying the another AR image associated with the another target device from a total area of a screen of the electronic device, is equal to or less than a threshold luminance value.

According to an aspect of the present disclosure, a non-transitory computer-readable storage medium stores instructions that, when executed by a processor of an electronic device, cause the processor to receive luminance information comprising a maximum luminance and a luminance setting value from at least one target device from among one or more external devices identified by the electronic device, to determine a luminance value of the at least one target device, based on the luminance information received from the at least one target device, and to determine a luminance value of an AR image associated with the at least one target device, based on the luminance value of the at least one target device.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
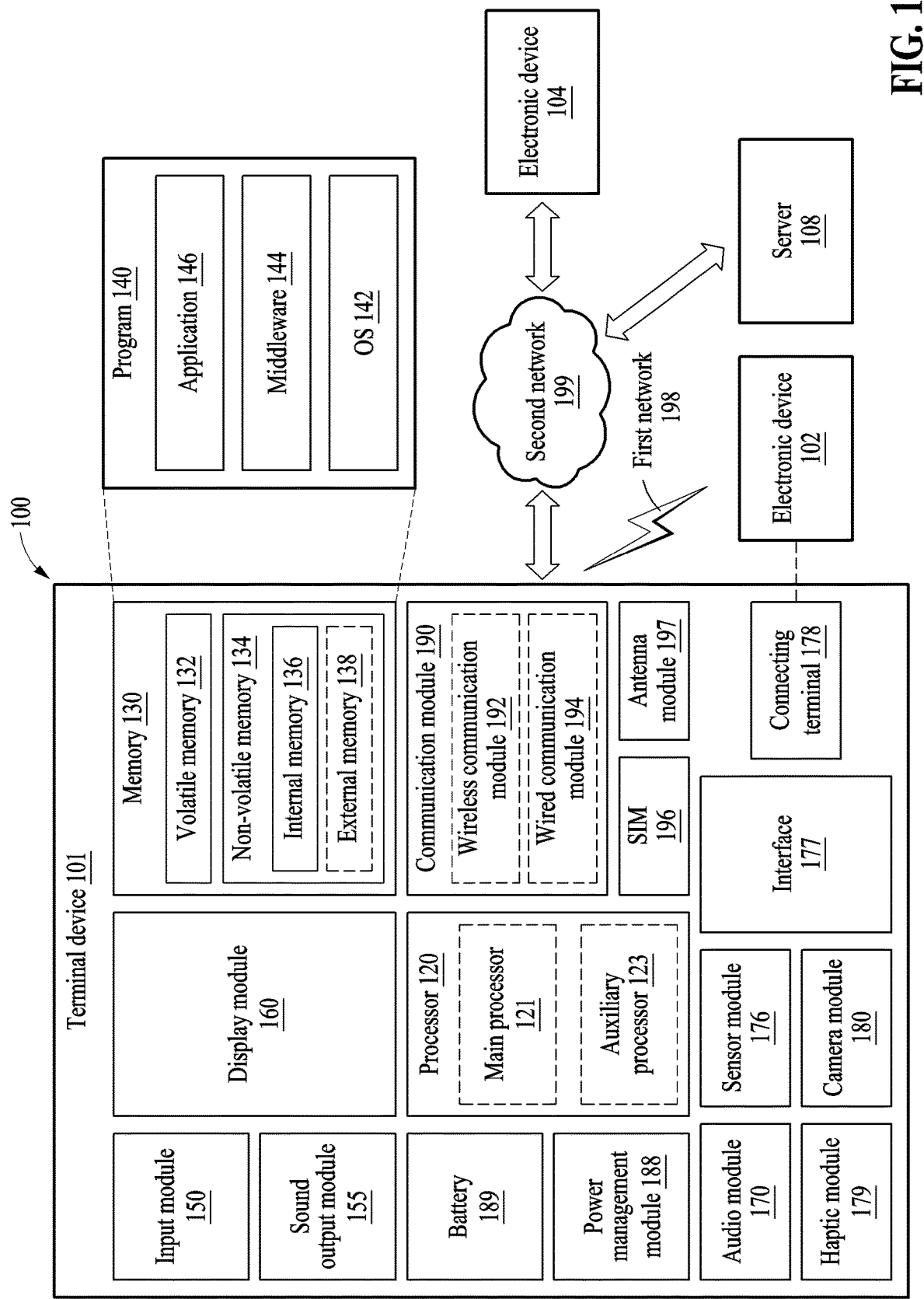
FIG. 1 is a block diagram of a terminal device in a network environment according to an embodiment.

Hereinafter, example embodiments will be described in detail with reference to the accompanying drawings. When describing the example embodiments with reference to the accompanying drawings, like reference numerals refer to like constituent elements and a repeated description related thereto will be omitted.

FIG. 1 is a block diagram illustrating a terminal device 101 in a network environment 100 according to various example embodiments. Referring to FIG. 1, the terminal device 101 in the network environment 100 may communicate with an electronic device 102 via a first network 198 (e.g., a short-range wireless communication network), or communicate with at least an of an electronic device 104 or a server 108 via a second network 199 (e.g., a long-range wireless communication network). According to an example embodiment, the terminal device 101 may communicate with the electronic device 104 via the server 108. According to an example embodiment, the terminal device 101 may include a processor 120, a memory 130, an input module 150, a sound output module 155, a display module 160, an audio module 170, and a sensor module 176, an interface 177, a connecting terminal 178, a haptic module 179, a camera module 180, a power management module 188, a battery 189, a communication module 190, a subscriber identification module (SIM) 196, or an antenna module 197. In some example embodiments, at least one of the components (e.g., the connecting terminal 178) may be omitted from the terminal device 101, or one or more other components may be added in the terminal device 101. In some example embodiments, some of the components (e.g., the sensor module 176, the camera module 180, or the antenna module 197) may be integrated as a single component (e.g., the display module 160).

The processor 120 may execute, for example, software (e.g., a program 140) to control at least one other component (e.g., a hardware or software component) of the terminal device 101 connected to the processor 120, and may perform various data processing or computation. According to an example embodiment, as at least a part of data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an example embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with the main processor 121. For example, when the terminal device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the main processor 121.

The auxiliary processor 123 may control at least some of functions or states related to at least one (e.g., the display module 160, the sensor module 176, or the communication module 190) of the components of the terminal device 101, instead of the main processor 121 while the main processor 121 is in an inactive (e.g., sleep) state or along with the main processor 121 while the main processor 121 is an active state (e.g., executing an application). According to an example embodiment, the auxiliary processor 123 (e.g., an ISP or a CP) may be implemented as a portion of another component (e.g., the camera module 180 or the communication module 190) that is functionally related to the auxiliary processor 123. According to an example embodiment, the auxiliary processor 123 (e.g., an NPU) may include a hardware structure specified for artificial intelligence model processing. An artificial intelligence model may be generated by machine learning. Such learning may be performed by, for example, the terminal device 101 in which an artificial intelligence model is executed, or performed via a separate server (e.g., the server 108). Learning algorithms may include, but are not limited to, for example, supervised learning, unsupervised learning, semi-supervised learning, or reinforcement learning. The artificial intelligence model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The AI model may additionally or alternatively include a software structure other than the hardware structure.

The memory 130 may store various data used by at least one component (e.g., the processor 120 or the sensor module 176) of the terminal device 101. The various data may include, for example, software (e.g., the program 140) and input data or output data for a command related thereto. The memory 130 may include the volatile memory 132 or the non-volatile memory 134. The non-volatile memory 134 may include an internal memory 136 and an external memory 138.

The program 140 may be stored as software in the memory 130, and may include, for example, an operating system (OS) 142, middleware 144, or an application 146.

The input module 150 may receive a command or data to be used by another component (e.g., the processor 120) of the terminal device 101, from the outside (e.g., a user) of the terminal device 101. The input module 150 may include, for example, a microphone, a mouse, a keyboard, a key (e.g., a button), or a digital pen (e.g., a stylus pen).

The sound output module 155 may output a sound signal to the outside of the terminal device 101. The sound output module 155 may include, for example, a speaker or a receiver. The speaker may be used for general purposes, such as playing multimedia or playing record. The receiver may be used to receive an incoming call. According to an example embodiment, the receiver may be implemented separately from the speaker or as a part of the speaker.

The display module 160 may visually provide information to the outside (e.g., a user) of the terminal device 101. The display module 160 may include, for example, a control circuit for controlling a display, a hologram device, or a projector and control circuitry to control a corresponding one of the display, the hologram device, and the projector. According to an example embodiment, the display module 160 may include a touch sensor adapted to detect a touch, or a pressure sensor adapted to measure the intensity of force incurred by the touch.

The audio module 170 may convert a sound into an electrical signal or vice versa. According to an example embodiment, the audio module 170 may obtain the sound via the input module 150 or output the sound via the sound output module 155 or an external electronic device (e.g., the electronic device 102 such as a speaker or a headphone) directly or wirelessly connected to the terminal device 101.

The sensor module 176 may detect an operational state (e.g., power or temperature) of the terminal device 101 or an environmental state (e.g., a state of a user) external to the terminal device 101, and generate an electric signal or data value corresponding to the detected state. According to an example embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the terminal device 101 to be coupled with the external electronic device (e.g., the electronic device 102) directly (e.g., by wire) or wirelessly. According to an example embodiment, the interface 177 may include, for example, a high-definition multimedia interface (HDMI), a universal serial bus (USB) interface, a secure digital (SD) card interface, or an audio interface.

The connecting terminal 178 may include a connector via which the terminal device 101 may be physically connected to an external electronic device (e.g., the electronic device 102). According to an example embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or an electrical stimulus which may be recognized by a user via his or her tactile sensation or kinesthetic sensation. According to an example embodiment, the haptic module 179 may include, for example, a motor, a piezoelectric element, or an electric stimulator.

The camera module 180 may capture a still image and moving images. According to an example embodiment, the camera module 180 may include one or more lenses, image sensors, image signal processors, or flashes.

The power management module 188 may manage power supplied to the terminal device 101. According to an example embodiment, the power management module 188 may be implemented as, for example, at least a part of a power management integrated circuit (PMIC).

The battery 189 may supply power to at least one component of the terminal device 101. According to an example embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the terminal device 101 and the external electronic device (e.g., the electronic device 102, the electronic device 104, or the server 108) and performing communication via the established communication channel. The communication module 190 may include one or more communication processors that are operable independently of the processor 120 (e.g., an AP) and that support a direct (e.g., wired) communication or a wireless communication. According to an example embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module, or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., a LAN or a wide area network (WAN)). These various types of communication modules may be implemented as a single component (e.g., a single chip), or may be implemented as multi components (e.g., multi chips) separate from each other. The wireless communication module 192 may identify and authenticate the terminal device 101 in a communication network, such as the first network 198 or the second network 199, using subscriber information (e.g., international mobile subscriber identity (IMSI)) stored in the SIM 196.

The wireless communication module 192 may support a 5G network after a 4G network, and a next-generation communication technology, e.g., a new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), an array antenna, analog beam-forming, or a large scale antenna. The wireless communication module 192 may support various requirements specified in the terminal device 101, an external electronic device (e.g., the electronic device 104), or a network system (e.g., the second network 199). According to an example embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device 102 or 104) of the terminal device 101. According to an example embodiment, the antenna module 197 may include an antenna including a radiating element including a conductive material or a conductive pattern formed in or on a substrate (e.g., a printed circuit board (PCB)). According to an example embodiment, the antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or the power may be transmitted or received between the communication module 190 and the external electronic device via the at least one selected antenna. According to an example embodiment, another component (e.g., a radio frequency integrated circuit (RFIC)) other than the radiating element may be additionally formed as a part of the antenna module 197.

According to various example embodiments, the antenna module 197 may form a mmWave antenna module. According to an example embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an example embodiment, commands or data may be transmitted or received between the terminal device 101 and the external electronic device 104 via the server 108 coupled with the second network 199. Each of the external electronic devices 102 and 104 may be a device of the same type as or a different type from the terminal device 101. According to an example embodiment, all or some of operations to be executed by the terminal device 101 may be executed at one or more of the external electronic devices 102 and 104, and the server 108. For example, if the terminal device 101 needs to perform a function or a service automatically, or in response to a request from a user or another device, the terminal device 101, instead of, or in addition to, executing the function or the service, may request one or more external electronic devices to perform at least part of the function or the service. The one or more external electronic devices (e.g., the external electronic devices 102 and 104) receiving the request may perform the at least part of the function or the service requested, or an additional function or an additional service related to the request, and may transfer an outcome of the performing to the terminal device 101. The terminal device 101 may provide the outcome, with or without further processing of the outcome, as at least part of a reply to the request. To that end, a cloud computing, distributed computing, mobile edge computing (MEC), or client-server computing technology may be used, for example. The terminal device 101 may provide ultra low-latency services using, e.g., distributed computing or mobile edge computing. In another example embodiment, the external electronic device 104 may include an Internet-of-things (IoT) device. The server 108 may be an intelligent server using machine learning and/or a neural network. According to an example embodiment, the external electronic device 104 or the server 108 may be included in the second network 199. The terminal device 101 may be applied to intelligent services (e.g., smart home, smart city, smart car, or healthcare) based on 5G communication technology or IoT-related technology.

Figure 2:
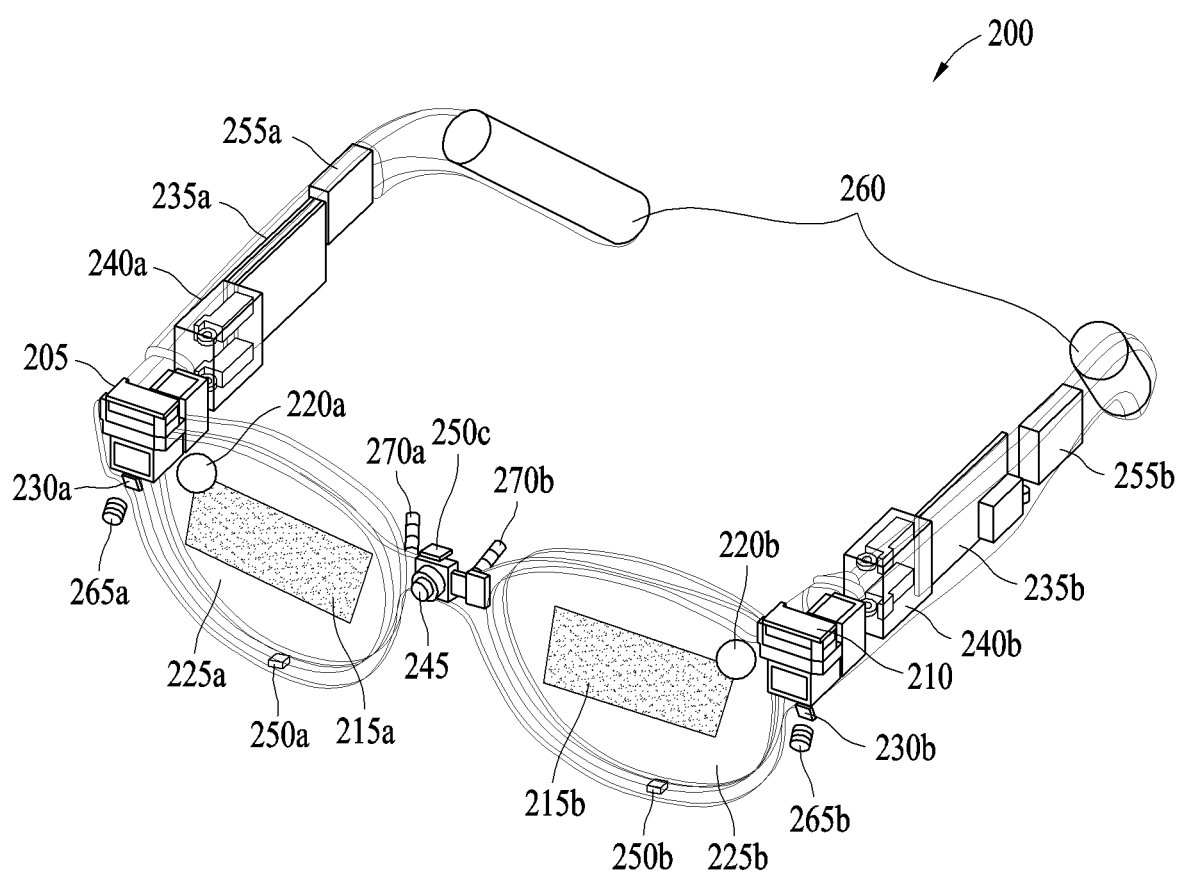
FIG. 2 is a diagram illustrating a structure of a wearable augmented reality (AR) device according to an embodiment.

FIG. 2 is a diagram illustrating a structure of a wearable augmented reality (AR) apparatus according to an example embodiment.

Referring to FIG. 2, a wearable AR device 200 may be worn on a face of a user to provide an image associated with an AR service and/or a virtual reality service to the user.

In an example embodiment, the wearable AR device 200 may include a first display 205, a second display 210, a screen display portion 215, an input optical member 220, a first transparent member 225a, a second transparent member 225b, lighting units 230a and 230b, a first PCB 235a, a second PCB 235b, a first hinge 240a, a second hinge 240b, first cameras 245a and 245b, a plurality of microphones (e.g., a first microphone 250a, a second microphone 250b, and a third microphone 250c), a plurality of speakers (e.g., a first speaker 255a, and a second speaker 255b), a battery 260, second cameras 275a and 275b, a third camera 265, and visors 270a and 270b.

In an example embodiment, a display (e.g., the first display 205 and the second display 210) may include, for example, a liquid crystal display (LCD), a digital mirror device (DMD), or a liquid crystal on silicon (LCoS), an organic light-emitting diode (OLED), a micro light-emitting diode (micro LED), or the like. Although not shown, when the display is one of an LCD, a DMD, and an LCoS, the wearable AR device 200 may include a light source configured to emit light to a screen output area of the display. In an example embodiment, when the display is capable of generating light by itself (e.g., when the display is either an OLED or a micro-LED), the wearable AR device 200 may provide a virtual image with a relatively high quality to the user even though a separate light source is not included. In an example embodiment, when the display is implemented as an OLED or a micro LED, a light source may be unnecessary, and, accordingly, the wearable AR device 200 may be reduced in weight. Hereinafter, a display capable of generating light by itself may be referred to as a "self-luminous display", and a description will be made on the assumption of the self-luminous display.

A display (e.g., the first display 205 and the second display 210) according to various example embodiments may include at least one micro-LED. For example, the micro-LED may express red (R), green (G), and blue (B) by emitting light by itself, and a single chip may implement a single pixel (e.g., one of R, G, and B pixels) because the micro-LED is relatively small in size (e.g., 100 μm or less). Accordingly, the display may provide a high resolution without a backlight unit (BLU), when the display is composed of a micro-LED.

However, the example embodiments are not limited thereto. For example, a pixel may include R, G and B, and a single chip may be implemented by a plurality of pixels including R, G, and B pixels.

In one example embodiment, the display (e.g., the first display 205 and the second display 210) may be composed of a display area made up of pixels for displaying a virtual image, and light-receiving pixels (e.g., photo sensor pixels) that receive the light reflected from eyes disposed among pixels, convert the reflected light into electrical energy, and output light.

In an example embodiment, the wearable AR device 200 may detect a gaze direction (e.g., a movement of a pupil) of the user through the light receiving pixels. For example, the wearable AR device 200 may detect and track a gaze direction of a right eye of the user and a gaze direction of a left eye of the user through one or more light-receiving pixels of the first display 205 and one or more light-receiving pixels of the second display 210. The wearable AR device 200 may determine a central position of a virtual image according to the gaze directions (e.g., directions in which pupils of the right eye and the left eye of the user gaze).

In an example embodiment, the light emitted from the display (e.g., the first display 205 and the second display 210) may reach the screen display portion 215 formed on the first transparent member 225a that faces the right eye of the user, and the screen display portion 215 formed on the second transparent member 225b that faces the left eye of the user, by passing through a lens (not shown) and a waveguide. For example, the light emitted from the display (e.g., the first display 205 and the second display 210) may be reflected from a grating area formed on the input optical member 220 and the screen display portion 215 to be delivered to the user's eyes, by passing through a waveguide. The first transparent member 225a and/or the second transparent member 225b may be formed as, for example, a glass plate, a plastic plate, or a polymer, and may be transparently and/or translucently formed.

In an example embodiment, a lens (not shown) may be disposed on a front surface of the display (e.g., the first display 205 and the second display 210). The lens may include a concave lens and/or a convex lens. For example, the lens may include a projection lens or a collimation lens.

In an example embodiment, the screen display portion 215 or the transparent member (e.g., the first transparent member 225a and the second transparent member 225b) may include a lens including a waveguide and a reflective lens.

In an example embodiment, the waveguide may be formed of glass, plastic, or a polymer, and may have a nanopattern formed on one surface of the inside or outside (e.g., a grating structure of a polygonal or a curved shape). According to an example embodiment, light incident to one end of the waveguide may be propagated inside a display waveguide by the nanopattern to be provided to the user. In an example embodiment, a waveguide including a free-form prism may provide incident light to the user through a reflection mirror. The waveguide may include at least one of diffractive elements (e.g., a diffractive optical element (DOE) or a holographic optical element (HOE) or at least one of a reflective element (e.g., a reflection mirror)). In an example embodiment, the waveguide may guide light emitted from the first display 205 and the second display 210 to the eyes of the user, using at least one diffractive element or a reflective element included in the waveguide.

According to various example embodiments, the diffractive element may include the input optical member 220 and/or an output optical member (not shown). For example, the input optical member 220 may refer to an input grating area, and the output optical member may refer to an output grating area. The input grating area may play a role as an input terminal which diffracts (and/or reflects) the light output from the display (e.g., the first display 205 and the second display 210) (e.g., a micro LED) to transmit the light to transparent members 250a and 250b of the screen display portion 215. The output grating region may serve as an exit for diffracting (or reflecting), to the user's eyes, the light transmitted to the transparent members (e.g., the first transparent member 250a and the second transparent member 250b) of the waveguide.

According to various example embodiments, the reflective element may include a total reflection optical element or a total reflection waveguide for total internal reflection (TIR). For example, TIR, which is one of various schemes for inducing light, may form an angle of incidence such that light (e.g., a virtual image) entering through the input grating area is reflected from one surface (e.g., a specific surface) of the waveguide, to transmit the light to the output grating area.

In an example embodiment, the light emitted from the first display 205 and the second display 210 may be guided by the waveguide through the input optical member 220. Light traveling in the waveguide may be guided toward the eyes of the user through the output optical member. The screen display portion 215 may be determined based on the light emitted toward the user's eyes.

In an example embodiment, the first cameras 245a and 245b may include a camera used for 3 degrees of freedom (3DoF), head tracking of 6DoF, hand detection and tracking, gestures and/or space recognition. For example, the first cameras 245a and 245b may include a global shutter (GS) camera to detect a movement of a head or a hand and track the movement.

For example, a stereo camera may be applied to the first cameras 245a and 245b for head tracking and space recognition, and a camera with the same standard and performance may be applied. A GS camera having an enhanced performance (e.g., image dragging) may be used for the first cameras 245a and 245b to detect a minute movement such as a quick movement of a hand or a finger and to track the movement.

According to various example embodiments, a rolling shutter (RS) camera may be used for the first cameras 245a and 245b. The first cameras 245a and 245b may perform a simultaneous localization and mapping (SLAM) function through space recognition and depth capturing for 6 Dof. The first cameras 245a and 245b may perform a user gesture recognition function.

In an embodiment, the second cameras 275a and 275b may be used for detecting and tracking the pupil. The second cameras 275a and 275b may be referred to as a camera for eye tracking (ET). The second camera 265a may track a gaze direction of the user. In consideration of the gaze direction of the user, the wearable AR device 200 may position a center of a virtual image projected on the screen display portion 215 according to the gaze direction of the user.

A GS camera may be used for the second cameras 275a and 275b to detect the pupil and track a quick pupil movement. The second camera 265a may be installed for a left eye or a right eye, and a camera having the same performance and standard may be used for the second camera 265a for the left eye and the right eye.

In an example embodiment, the third camera 265 may be referred to as a "high resolution (HR)" or a "photo video (PV)", and may include a high-resolution camera. The third camera 265 may include a color camera having functions for obtaining a high-quality image, such as an automatic focus (AF) and an optical image stabilizer (OIS). The example embodiments are not limited thereto, and the third camera 265 may include a GS camera or an RS camera.

In an example embodiment, at least one sensor (e.g., a gyro sensor, an acceleration sensor, a geomagnetic sensor, a touch sensor, an illuminance sensor and/or a gesture sensor) and the first cameras 245a and 265a may perform at least one of the functions among head tracking for 6DoF, pose estimation and prediction, gesture and/or space recognition, and a SLAM through depth imaging.

In another embodiment, the first camera 245a and 245b may be classified and used as a camera for head tracking or a camera for hand tracking.

In an example embodiment, the lighting units 230a and 230b may be used differently according to positions in which the light units 230a and 230b are attached. For example, the lighting units 230a and 230b may be attached together with the first cameras 245a and 245b mounted around a hinge (e.g., the first hinge 240a and the second hinge 240b) that connects a frame and a temple or around a bridge that connects frames. If capturing is performed using a GS camera, the lighting units 230a and 230b may be used to supplement a surrounding brightness. For example, the lighting units 230a and 230b may be used in a dark environment or when it is not easy to detect a subject to be captured due to reflected light and mixing of various light sources.

In an example embodiment, the lighting units 230a and 230b attached to the periphery of the frame of the wearable AR device 200 may be an auxiliary means for facilitating detection of an eye gaze direction when the second cameras 275a and 275b capture pupils. When the lighting units 230a and 230b are used as an auxiliary means for detecting a gaze direction, an IR LED of an IR wavelength may be included.

In an example embodiment, a PCB (e.g., the first PCB 235a and the second PCB 235b) may include a processor (not shown), a memory (not shown), and a communication module (not shown) that control components of the wearable AR device 200. The communication module may have the same configuration as the communication module 190 of FIG. 1, and the same description as the communication module 190 may be applicable to the communication module. For example, the communication module may support establishing a direct (e.g., wired) communication channel and/or a wireless communication channel between the wearable AR device 200 and an external electronic device (e.g., external electronic device 102 or 104), and support and performing communication through the established communication channel. The PCB may transmit an electrical signal to the components constituting the wearable AR device 200.

The communication module may include one or more communication processors that are operable independently of the processor and that support a direct (e.g., wired) communication and/or a wireless communication. According to an example embodiment, the communication module (not shown) may include a wireless communication module (e.g., a cellular communication module, a short-range wireless communication module, or a global navigation satellite system (GNSS) communication module) and/or a wired communication module (e.g., a local area network (LAN) communication module, or a power line communication (PLC) module). A corresponding one of these communication modules may communicate with the external electronic device 102 via a short-range communication network (e.g., Bluetooth™, wireless-fidelity (Wi-Fi) direct, or infrared data association (IrDA)) or a long-range communication network (e.g., a legacy cellular network, a 5th generation (5G) network, a next-generation communication network, the Internet, or a computer network (e.g., a LAN or a wide area network (WAN)). These various types of communication modules may be implemented as a single component (e.g., a single chip), or may be implemented as multiple components (e.g., multi chips) separate from each other.

The wireless communication module may support a 5G network after a 4G network, and a next-generation communication technology, e.g., a new radio (NR) access technology. The NR access technology may support enhanced mobile broadband (eMBB), massive machine type communications (mMTC), or ultra-reliable and low-latency communications (URLLC). The wireless communication module may support a high-frequency band (e.g., a mmWave band) to achieve, e.g., a high data transmission rate. The wireless communication module may support various technologies for securing performance on a high-frequency band, such as, e.g., beamforming, massive multiple-input and multiple-output (MIMO), full dimensional MIMO (FD-MIMO), an array antenna, analog beam-forming, or a large scale antenna.

The wearable AR device 200 may further include an antenna module (not shown). The antenna module may transmit or receive a signal or power to or from the outside (e.g., the external electronic device 102 or 104) of the wearable AR device 200. According to an example embodiment, the antenna module may include an antenna including a radiating element including a conductive material or a conductive pattern formed in or on a substrate (e.g., the first PCB 235a and the second PCB 235b). According to an example embodiment, the antenna module may include a plurality of antennas (e.g., array antennas).

In an example embodiment, a plurality of microphones (e.g., the first microphone 250a, the second microphone 250b, and the third microphone 250c) may convert an external acoustic signal into electrical audio data. The processed audio data may be variously utilized according to a function (and/or an application being executed) being performed by the wearable AR device 200.

In an example embodiment, the plurality of speakers (e.g., the first speaker 255a and the second speaker 255b) may output audio data received from the communication module or stored in the memory.

In an example embodiment, one or more batteries 260 may be included, and may supply power to components constituting the wearable AR device 200.

In an embodiment, the visors 270a and 270b may adjust a transmittance amount of external light incident on the user's eyes according to a transmittance. The visors 270a and 270b may be positioned in front or behind the screen display portion 215. A front side of the screen display portions 215a and 215b may mean a direction opposite to the user wearing the wearable AR device 200, and a rear side may mean a direction of the user wearing the wearable AR device 200. The visors 270a and 270b may protect the screen display portion 215 and adjust an transmittance amount of external light.

For example, the visors 270a and 270b may include an electrochromic element that changes color according to applied power to adjust a transmittance. Electrochromism may refer to a phenomenon in which an applied power triggers an oxidation-reduction reaction to change color of an element. The visors 270a and 270b may adjust a transmittance of external light, using the color change of the electrochromic element.

For example, the visors 270a and 270b may include a control module and an electrochromic element. The control module may control the electrochromic element to adjust a transmittance of the electrochromic element.

Figure 3:
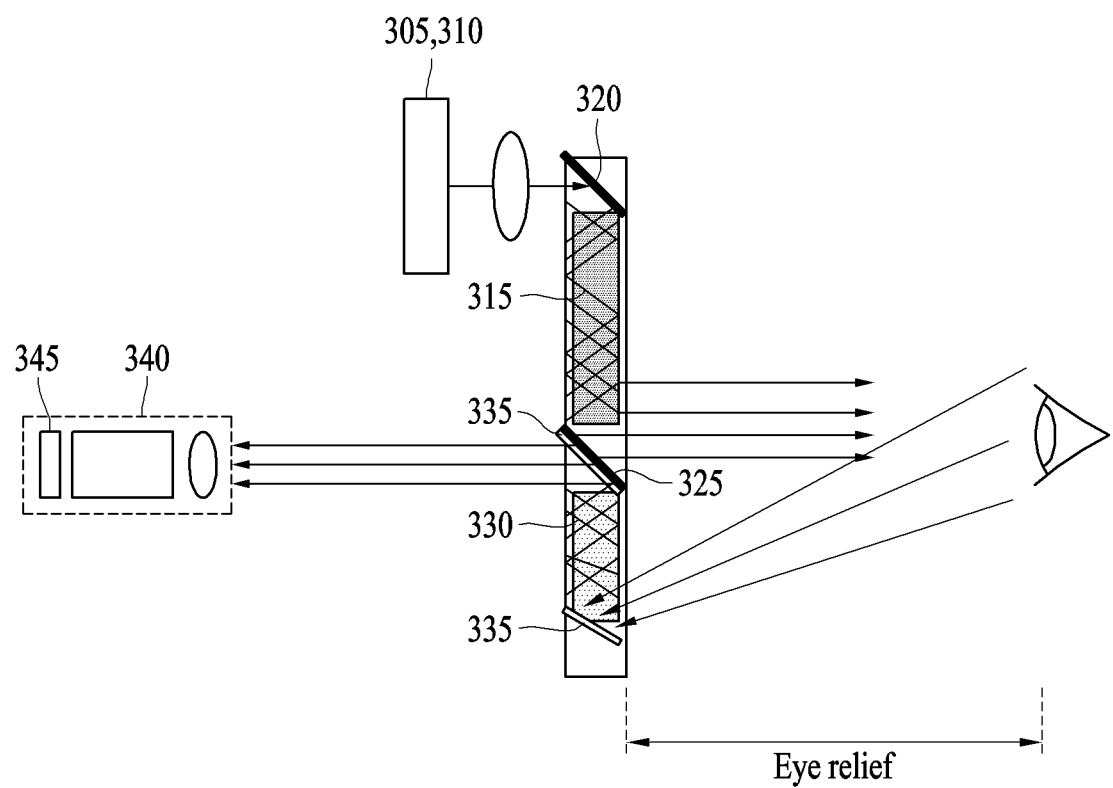
FIG. 3 is a diagram illustrating a camera and an eye tracking sensor of a wearable augmented reality device according to an embodiment.

FIG. 3 is a diagram illustrating a camera and an eye tracking sensor of a wearable AR device, according to an example embodiment.

Referring to FIG. 3, a wearable AR device (e.g., the wearable AR device 200 of FIG. 2) may include displays 305 and 310 (e.g., the displays 205 and 210 of FIG. 2), an optical waveguide (or a waveguide) 315, an input optical member 320 (e.g., the input optical member 220), an output optical member 325 (e.g., the output optical member 325), an eyetracking (ET) optical waveguide (or an ET waveguide) 330, an ET splitter 335, a camera 340 (e.g., the second cameras 275a and 275b), an ET sensor 345, and a lighting unit (e.g., the lighting units 230a and 230b of FIG. 2).

Referring to FIG. 3, the light output from the displays 305 and 310 of the wearable AR device 200 may be transmitted to the user's eye in the output optical member 325 by inputting to the input optical member 320 and passing through the optical waveguide 315.

Referring to FIG. 3, the camera 340 may obtain an image of the user's eye. For example, the image of the user's eyes may be transmitted to the ET splitter 335 on the upper side by inputting to the ET splitter 335 on the lower side and passing through the ET optical waveguide 330. The camera 340 may obtain the image of the user's eye from the ET splitter 335 on the upper side.

The lighting unit may output IR light to the user's pupil region. The infrared light may be reflected from the user's pupil and transmitted to the ET splitter 335 together with the image of the user's eye. The image of the user's eye obtained by the camera 340 may include the reflected IR light. The ET sensor 345 may sense the IR light reflected from the user's pupil.

Figure 4:
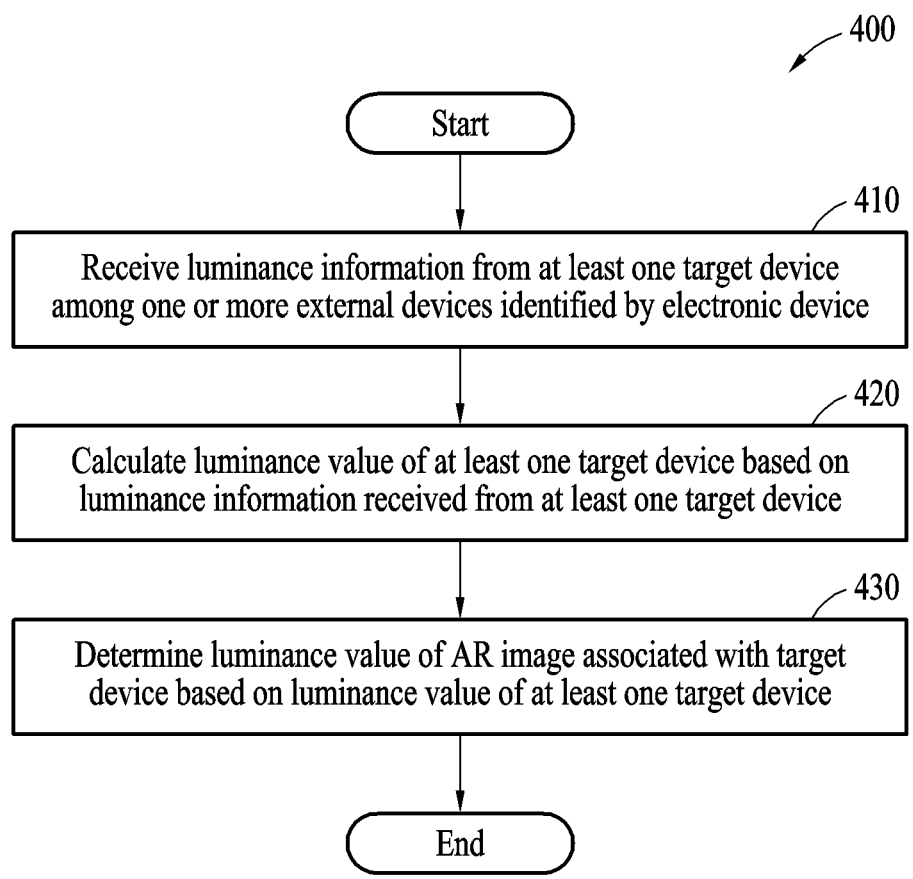
FIG. 4 is a flowchart illustrating an operation of an electronic device to display an AR image associated with a target device, according to an embodiment.

FIG. 4 is a flowchart 400 illustrating an operation of an electronic device to display an AR image associated with a target device, according to an example embodiment.

In an embodiment, the electronic device may be a wearable AR device 200. In operation 410, the electronic device (e.g., the terminal device 101 of FIG. 1 or the wearable AR device 200 of FIG. 2) may receive luminance information including a maximum luminance and a luminance setting value from at least one target device among one or more external devices identified by the electronic device.

The electronic device may identify an external device (e.g., external electronic device 102 or 104) around the electronic device. When the electronic device is communicatively connected to at least one target device among the external devices, the electronic device may receive luminance information including a maximum luminance and a luminance setting value from the at least one target device (e.g., external electronic device 102 or 104). The maximum luminance of the target device may represent a maximum luminance value that each pixel of a display of the target device may output. The luminance setting value of the target device may be a setting value for the luminance applied to the target device and may represent a value limiting the maximum luminance that each pixel of the display of the target device may output. The luminance setting value of the target device may be calculated by a ratio of a luminance limit of the target device to the maximum luminance of the target device. For example, when the maximum luminance of the target device is 1000 nit and the luminance limit of the target device is 800 nit, the luminance setting value of the target device may be 0.8 (800/1000).

In operation 420, the electronic device may calculate a luminance value of the at least one target device based on the received luminance information from the at least one target device. The luminance value of the target device may represent an amount of light output from the target device, passing through the electronic device, and entering the retina of a user wearing the electronic device. Hereinafter, the description is provided based on that the luminance value of the target device is the same as the luminance value of an image output from the target device. For example, the luminance value of the target device may be determined based on an average value of luminance values output from each pixel on the display of the target device.

In operation 430, the electronic device may determine a luminance value of an AR image associated with the target device, based on the luminance value of the target device. In an embodiment, the electronic device may determine the luminance value of the AR image by the luminance value of the target device. The electronic device may display, on a screen (e.g., the screen display portion 215 of FIG. 2), the AR image associated with the target device at the luminance value of an image output from the target device. The electronic device may provide visual comfort to a user who simultaneously views the image output from the target device and the AR image associated with the target device.

In an embodiment, the electronic device may adjust a mask opacity of an AR area displaying the AR image associated with the target device, based on the determined luminance value of the AR image associated with the target device. The electronic device may display the AR image associated with the target device on the screen. The AR image may be an image corresponding to the image output from the target device. For example, when the target device outputs an image capturing a soccer game, the electronic device may output an image capturing the soccer game from another camera view, as an AR image. The electronic device may also output an image displaying status information of a specific soccer player, as an AR image. In an embodiment, the electronic device may change a mask opacity for each area of the screen. By adjusting the mask opacity for each area of the screen, the electronic device may adjust the luminance value of the AR image displayed on a predetermined area.

Figure 5:
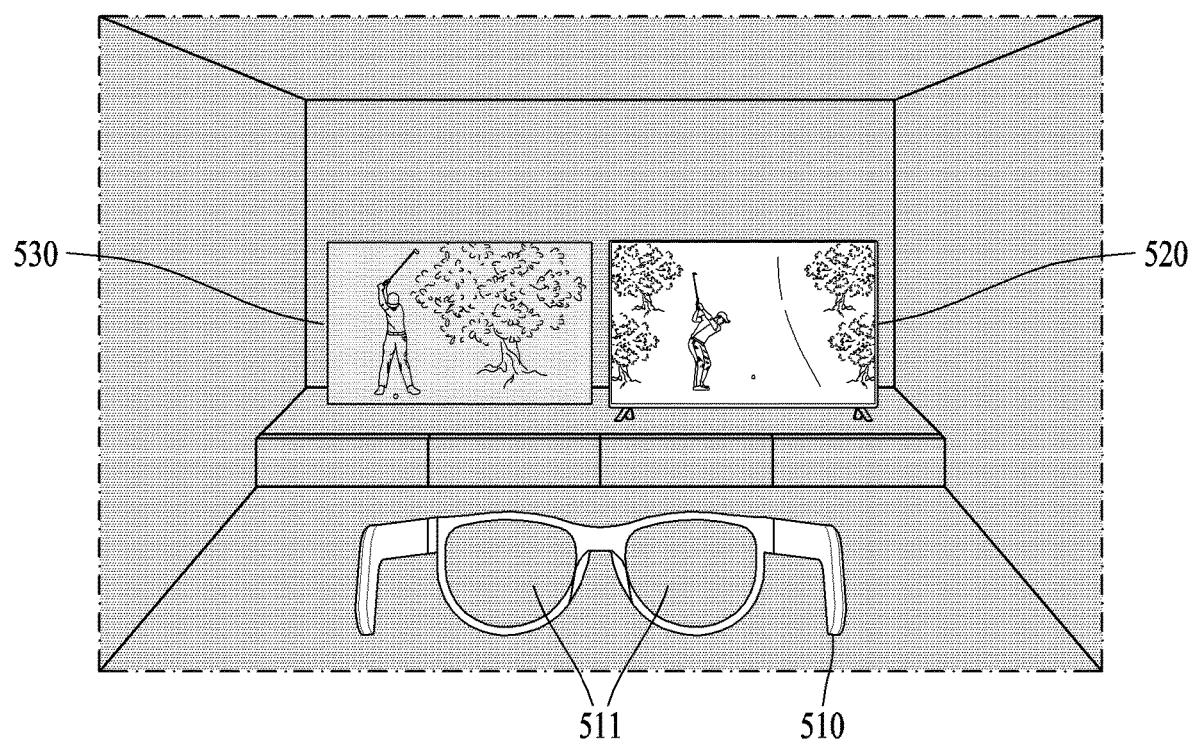
FIG. 5 is a diagram illustrating an operation of an electronic device to display an AR image associated with a target device, according to an embodiment.

FIG. 5 is a diagram illustrating an operation of an electronic device to display an AR image associated with a target device, according to an example embodiment.

According to an example embodiment, an electronic device 510 (e.g., the terminal device 101 of FIG. 1 or the wearable AR device 200 of FIG. 2) may identify an external device around the electronic device 510. For example, the electronic device 510 may identify the external device around the electronic device 510 through a communication module (e.g., the communication module 190 of FIG. 1). As another example, the electronic device 510 may identify the external device around the electronic device 510 through a sensor module (e.g., the sensor module 176 of FIG. 1) or a camera module (e.g., the camera module 180 of FIG. 1).

The electronic device 510 may establish communication with a target device 520 among external devices and may receive, from the target device 520, luminance information including a maximum luminance and a luminance setting value. In an embodiment, when the user wears the electronic device 510, the electronic device 510 may display an AR image 530 associated with the target device 520 on a screen 511 of the target device 520. When a difference between a luminance value of an image output from the target device 520 and a luminance value of the AR image 530 is large, the user wearing the electronic device 510 may feel visual fatigue. Accordingly, the electronic device 510 may modify the luminance value of the AR image 530, based on the luminance value of the target device 520.

In an embodiment, the image output from the target device 520 may be visualized on the screen 511 (e.g., the screen display portion 215 of FIG. 2). The electronic device 510 may display the AR image 530 associated with the target device 520 on the screen 511.

In an embodiment, the electronic device 510 may calculate the luminance value of the target device 520, based on the luminance information received from the target device 520. For example, the luminance value of the target device may be calculated by Equation 1 shown below.

$$\text{Luminance value of target device} = \text{Maximum luminance of target device} \times \text{Luminance setting value of target device} \times \text{Light transmittance of electronic device} \times \text{Attenuation rate due to light radiation range} \quad \text{[Equation 1]}$$

In Equation 1, the light transmittance of the electronic device 510 may represent a degree to which the electronic device transmits incident light from the outside. In Equation 1, the attenuation rate due to the light radiation range may represent a degree that the luminance decreases depending on a distance between the target device 520 and the electronic device 510. Since the intensity of light decreases in inverse proportion to the distance from the light source, the luminance of the target device 520 may decrease in inverse proportion to the distance between the target device 520 and the electronic device 510.

The electronic device 510 may calculate the luminance limit of the target device 520 by using the luminance information received from the target device 520 and may calculate the luminance value of the target device 520, based on the calculated luminance limit of the target device 520 and the light transmittance of the electronic device 510.

In some embodiments, the electronic device 510 may calculate the luminance limit of the target device 520 by multiplying the maximum luminance of the target device 520 by the luminance setting value. For example, when the maximum luminance of the target device 520 is 1000 nit and the luminance setting value is 0.8, the maximum luminance that each pixel on the display of the target device 520 may output may be limited to 800 nit.

The electronic device 510 may calculate an attenuation rate due to a light radiation range. For example, the electronic device 510 may calculate a distance between the target device 520 and the electronic device 510 by using a distance measuring sensor and may calculate the attenuation rate due to a light radiation range, based on the calculated distance. As another example, the electronic device 510 may load a preset distance (e.g., 3 m) for the target device 520 and may calculate the attenuation rate due to the light radiation range, based on the preset distance. The electronic device 510 may calculate the luminance value of the target device 520 by Equation 1 and may determine the luminance value of the AR image 530 associated with the target device based on the calculated luminance value of the target device 520.

The electronic device 510 may receive modified luminance information from the target device 520. Since the luminance value of the image of the target device 520 may be modified, the electronic device 510 may need to modify the luminance value of the AR image 530 associated with the target device 520. The electronic device 510 may calculate the modified luminance value of the target device 520 by receiving the modified luminance information from the target device 520 and may modify the luminance value of the AR image 530 associated with the target device 520, based on the modified luminance value of the target device 520. For example, the electronic device 510 may periodically receive the luminance information from the target device 520 and accordingly, may continuously track the luminance value of the target device 520.

Figure 6A:
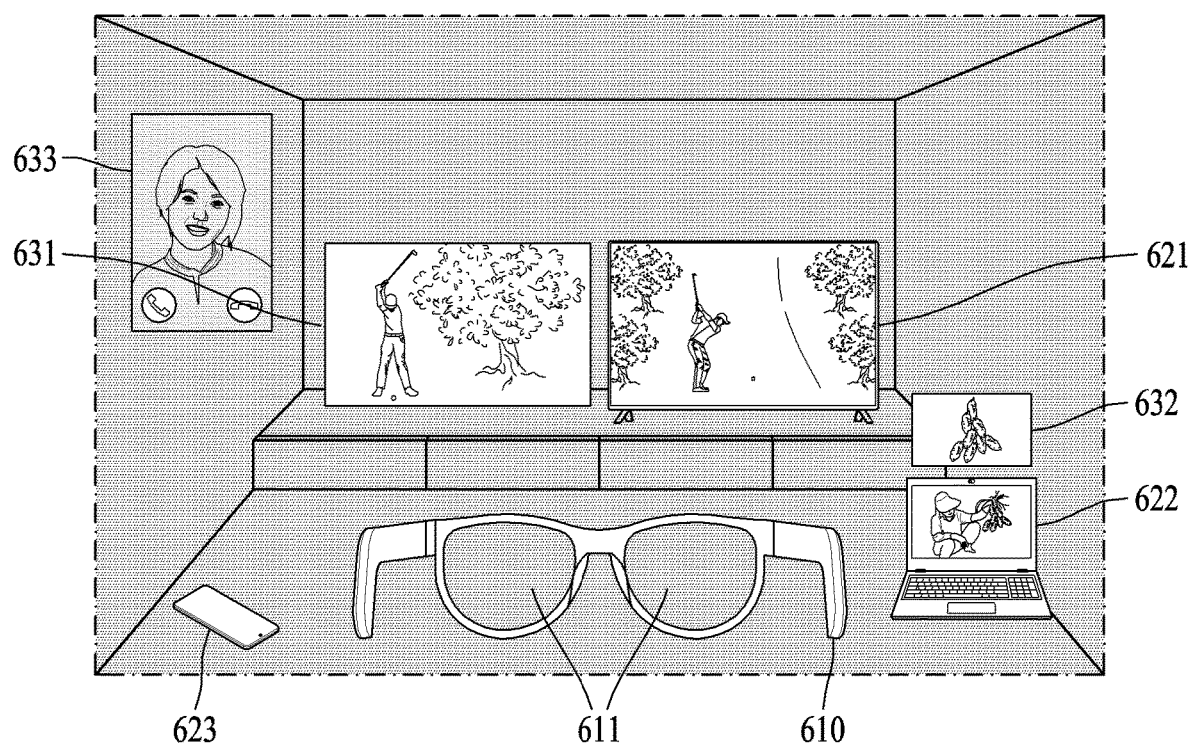
FIG. 6A is a diagram illustrating an operation of an electronic device to individually display AR images associated with a plurality of target devices, according to an embodiment.

FIG. 6A is a diagram illustrating an operation of an electronic device to individually display AR images associated with a plurality of target devices, according to an example embodiment.

In an embodiment, an electronic device 610 (e.g., the terminal device 101 of FIG. 1, the wearable AR device 200 of FIG. 2, or the electronic device 510 of FIG. 5) may identify external devices around the electronic device 610. The electronic device 610 may receive luminance information including a maximum luminance and luminance setting value from a plurality of target devices (e.g., target devices 621, 622, and 623) from among the identified external devices. The electronic device 610 may display AR images 631, 632, and 633 respectively associated with the target devices 621, 622, and 623 on a screen 611 (e.g., the screen display portion 215 of FIG. 2) of the electronic device 610.

In an embodiment, when the electronic device 610 visualizes images output from the target devices 621 and 622 on the screen 611 of the electronic device 610, the electronic device 610 may determine luminance values of the AR images 631 and 632 associated with the target devices 621 and 622, based on luminance values of the target devices 621 and 622, respectively. For example, when the electronic device 610 visualizes the image output from the target device 621 (e.g., a television (TV)) on the screen 611 of the electronic device 610, the electronic device 610 may determine the luminance value of the AR image 631 associated with the target device 621, based on the luminance value of the target device 621. Similarly, when the electronic device 610 identifies the image output from the target device 622 (e.g., a tablet) on the screen 611 of the electronic device 610, the electronic device 610 may determine the luminance value of the AR image 632 associated with the target device 622, based on the luminance value of the target device 622.

In an embodiment, when the electronic device 610 does not visualize the image output from the target device 623 on the screen 611 of the electronic device 610, the electronic device 610 may determine the luminance value of the AR image 633 associated with the target device 623 regardless of the luminance value of the target device 623. The electronic device 610 may determine the luminance value of the AR image 633 associated with the target device 623, based on an ambient illuminance value of the electronic device 610. For example, when the electronic device 610 fails to visualize an image output from the target device 633 (e.g., a mobile terminal) on the screen 611 of the electronic device 610, the electronic device 610 may determine the luminance value of the AR image 633 associated with the target device 623, based on the ambient illuminance value of the electronic device 610.

Figure 6B:
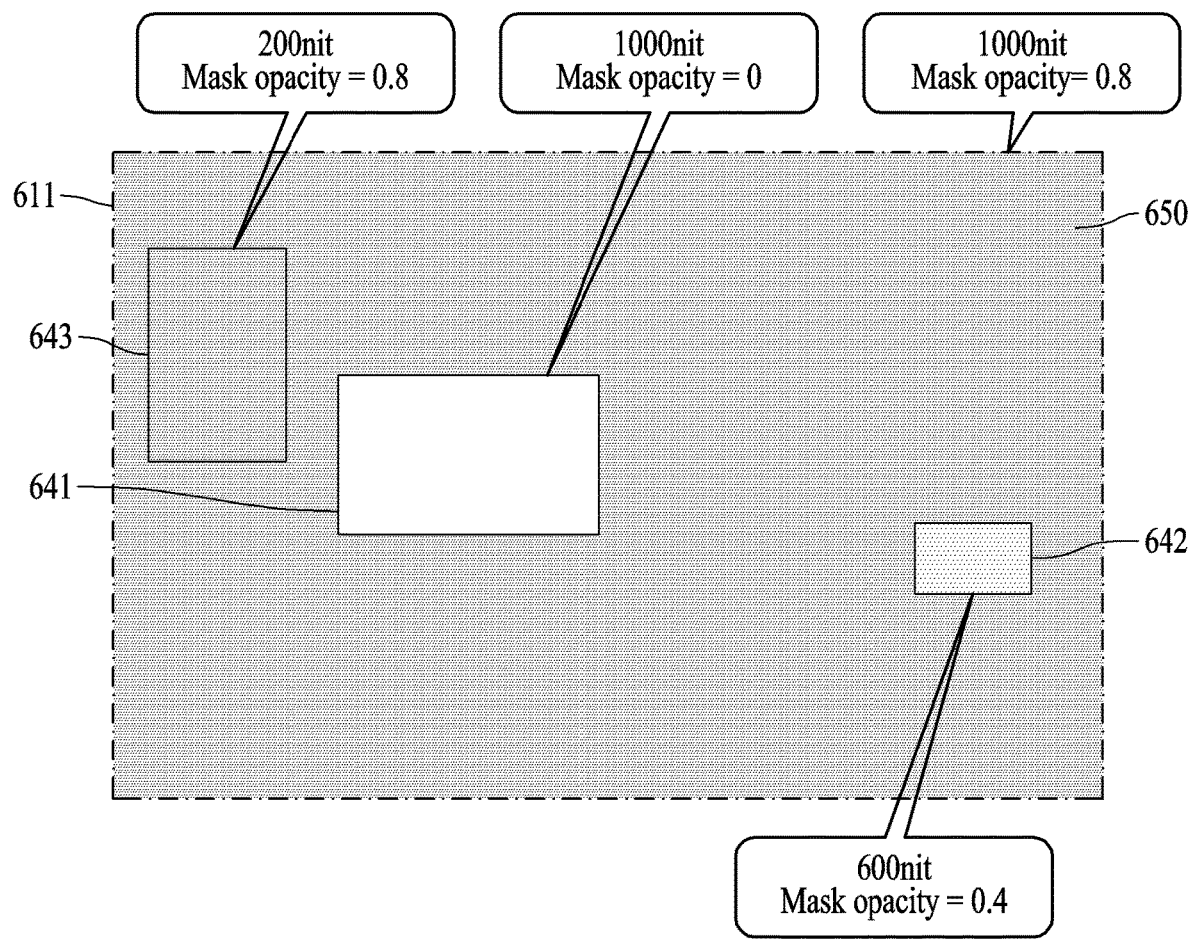
FIG. 6B is a diagram illustrating an operation of an electronic device to adjust a mask opacity for each AR area for displaying an AR image, according to an embodiment.

FIG. 6B is a diagram illustrating an operation of the electronic device to adjust a mask opacity for each AR area for displaying an AR image, according to an example embodiment.

In an embodiment, the electronic device may adjust a mask opacity for each area of the screen 611 (e.g., the screen display portion 215 of FIG. 2). First, the electronic device may set a maximum luminance of the electronic device to an output luminance value of a display (e.g., the displays 205 and 210 of FIG. 2). The maximum luminance may represent a luminance that each pixel on the display may output at maximum.

As described above, when the electronic device 610 visualizes an image output from the target device 621 on the screen 611 of the electronic device 610, the electronic device 610 may determine the luminance value of the AR image 631 associated with the target device 621, based on the luminance value of the target device 621. In an embodiment, the electronic device 610 may adjust a mask opacity of an AR area 641 displaying the AR image 631 associated with the target device 621, based on a ratio of the luminance value of the AR image 631 associated with the target device 621 to the maximum luminance of the electronic device 610. For example, when the electronic device 610 determines the luminance value of the AR image 631 associated with the target device 621 to be the same as the luminance value of the target device 621, the electronic device 610 may adjust the mask opacity of the AR area 641, based on the ratio of the luminance value of the target device 621 to the maximum luminance of the electronic device 610. In this case, the electronic device 610 may calculate the mask opacity of the AR area 641 by Equation 2 shown below.

$$\text{Mask opacity of } AR \text{ area} = 1 - \frac{\text{Luminance value of target device}}{\text{Maximum luminance of electronic device}} \quad \text{[Equation 2]}$$

In Equation 2, the electronic device may determine the mask opacity of the AR area 641 to be a value subtracting the ratio of the luminance value of the target device 621 to the maximum luminance of the electronic device from "1".

For example, it is supposed that the maximum luminance of the electronic device is 1000 nit and the luminance value of the target device 621 is 1000 nit. The electronic device may adjust the mask opacity of the AR area 641 displaying the AR image 631 associated with the target device 621 to $$0\left(1 - \frac{1000(nit)}{1000(nit)}\right).$$

That is, the electronic device may not mask the AR area 641. As another example, when the luminance value of the target device 622 is calculated as 600 nit, the electronic device may adjust the mask opacity of the AR area 642 displaying the AR image 632 associated with the target device 622 to $$0.4\left(1 - \frac{600(nit)}{1000(nit)}\right).$$

In an embodiment, when the image output from the target device 623 is not visualized on the screen 611 of the electronic device 610, the electronic device 610 may adjust the luminance value of the AR image 643 associated with the target device 623, based on an ambient illuminance value of the electronic device 610. In an embodiment, the electronic device 610 may determine the luminance value of the AR image 643 by the ambient illuminance value of the electronic device 610. In this case, the electronic device 610 may adjust the mask opacity of the AR area 643 based on a ratio of the ambient illuminance value of the electronic device 610 to the maximum luminance of the electronic device 610. For example, the electronic device 610 may calculate the mask opacity of the AR area 643 by Equation 3 shown below.

$$\text{Mask opacity of } AR \text{ area} = 1 - \frac{\text{Ambient illuminance value of electronic device}}{\text{Maximum luminance of electronic device}} \quad \text{[Equation 3]}$$

In Equation 3, the electronic device 610 may determine the mask opacity of the AR area 643 to be a value subtracting the ratio of the ambient illuminance value of the electronic device 610 to the maximum luminance of the electronic device 610 from "1".

For example, when the ambient luminance value of the electronic device 610 is calculated as 200 nit, the electronic device 610 may adjust the mask opacity of the AR area 643 displaying the AR image 633 associated with the target device 623 to $$0.8\left(1 - \frac{200(nit)}{1000(nit)}\right).$$

Furthermore, the electronic device 610 may determine a luminance value of a background area 650 excluding the AR areas 641, 642, and 643 displaying AR images 631, 632, and 633 from the total area of the screen 611, based on the ambient illuminance value of the electronic device 610. In an embodiment, the electronic device 610 may determine the luminance value of the background area 650 by the ambient illuminance value of the electronic device 610. The electronic device 610 may adjust the mask opacity of the background area 650 excluding the AR areas 641, 642, and 643 displaying the AR images 631, 632, and 633 from the total area of the screen 611, based on a ratio of the ambient illuminance value of the electronic device 610 to the maximum luminance of the electronic device 610. For example, when the ambient illuminance value of the electronic device 610 is calculated as 200 nit, the electronic device 610 may adjust the mask opacity of the background area 650 to $$0.8\left(1 - \frac{200(nit)}{1000(nit)}\right).$$

Figure 7:
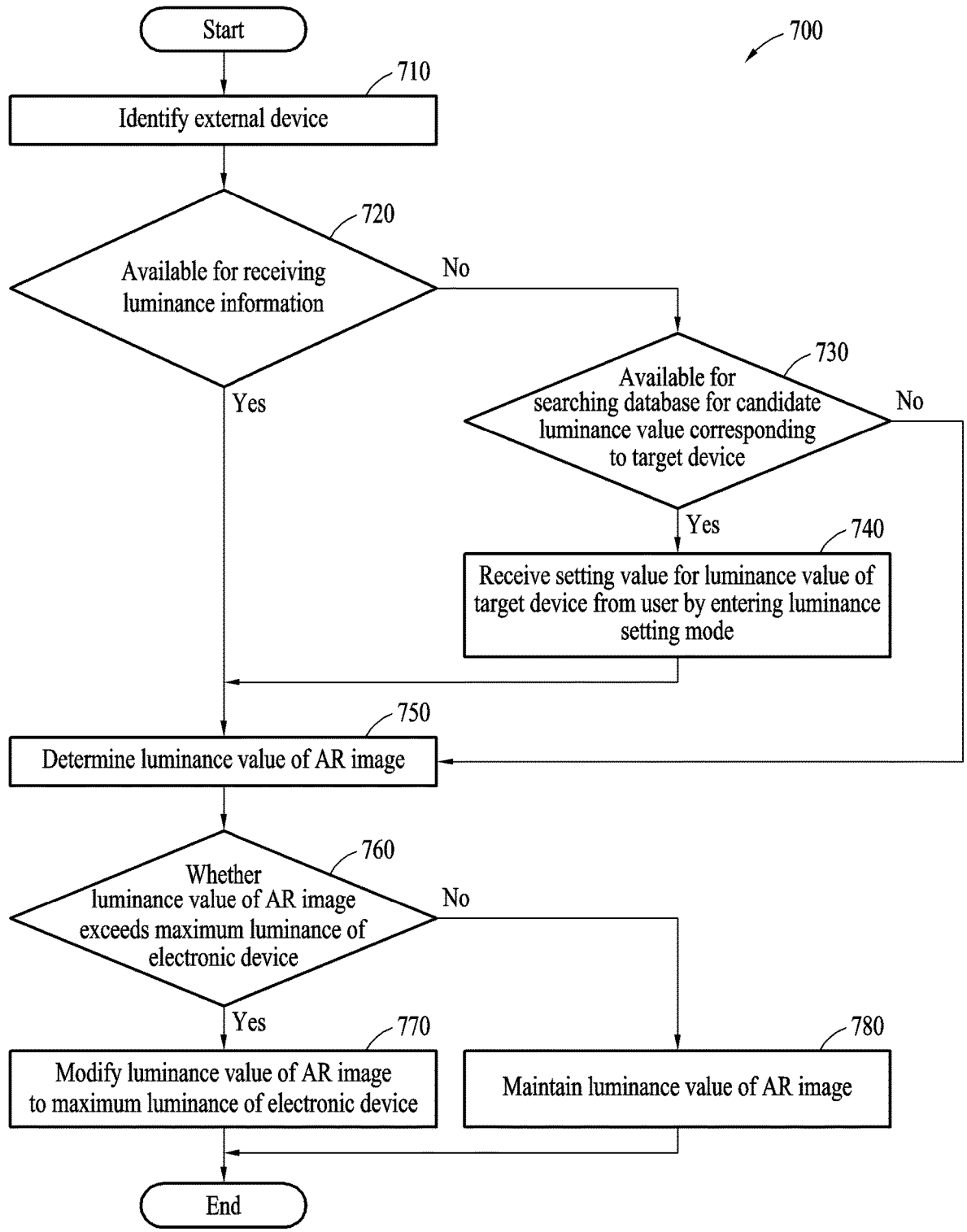
FIG. 7 is a flowchart illustrating an operation of an electronic device to display an AR image associated with a target device, according to an embodiment.

FIG. 7 is a flowchart 700 illustrating an operation of an electronic device to display an AR image associated with a target device, according to an example embodiment.

In operation 710, an electronic device (e.g., the terminal device 101 of FIG. 1, the wearable AR device 200 of FIG. 2, the electronic device 510 of FIG. 5, or the electronic device 610 of FIG. 6) may identify one or more external devices around the electronic device 710.

In operation 720, the electronic device may determine whether the electronic device may receive luminance information including a maximum luminance and a luminance setting value of the identified one or more external devices.

In an embodiment, the electronic device may receive, from at least one target device among the identified one or more external devices, the luminance information including the maximum luminance and the luminance setting value. The electronic device may calculate a luminance value of the at least one target device, based on the luminance information received from the at least one target device. For example, the electronic device may receive the luminance information from the target device communicatively connected to the electronic device. However, the electronic device may not receive the luminance information from the target device even if the target device is communicatively connected to the electronic device. In this case, operation 730 may be performed.

In an embodiment, when the electronic device fails to receive, from the other target device excluding the at least one target device among the identified one or more external devices, the luminance information including the maximum luminance and the luminance setting value, the electronic device may search a database for a candidate luminance value corresponding to the other target device. That is, since the electronic device may not receive the luminance information from the target device that is not communicatively connected to the electronic device, the electronic device may determine the luminance value of the AR image in a different way from the target device that is communicatively connected.

In operation 730, when the electronic device may not receive the luminance information from the other target device except for the at least one target device among the identified one or more external devices, the electronic device may determine whether the candidate luminance value corresponding to the other target device may be retrieved from the database. The candidate luminance value corresponding to the other target device may represent a luminance value mapped with spatial information and an illuminance value.

In an embodiment, the electronic device may further include a database configured to store a result obtained by mapping one piece of spatial information and one illuminance value with one candidate luminance value. When the candidate luminance value corresponding to the other target device is retrieved from the database, the electronic device may determine the luminance value of the AR image associated with the other target device by the retrieved candidate luminance value.

In operation 740, when the candidate luminance value corresponding to the other target device is not retrieved from the database, the electronic device may enter a luminance setting mode. By entering the luminance setting mode, the electronic device may receive a setting value for the luminance value of the other target device from a user. The electronic device may determine the luminance value of the AR image associated with the other target device by the setting value for the luminance value received from the user.

In operation 750, the electronic device may determine the luminance value of the AR image associated with the target device.

In operation 760, the electronic device may determine whether the luminance value of the AR image associated with the target device exceeds the maximum luminance of the electronic device.

In operation 770, when the luminance value of the AR image associated with the target device exceeds the maximum luminance of the electronic device, the electronic device may modify the luminance value of the AR image associated with the target device to the maximum luminance of the electronic device. The electronic device may not apply masking to the AR area displaying the AR image associated with the target device. For example, the electronic device may adjust the mask opacity of the AR area displaying the AR image associated with the target device to "0". That is, when the luminance value of the AR image associated with the target device exceeds the maximum luminance of the electronic device, the electronic device may output the AR image at the maximum luminance of the electronic device since the display of the electronic device may not output the AR image at the luminance value of the AR image associated with the target device.

In operation 780, when the luminance value of the AR image associated with the target device is equal to or less than the maximum luminance of the electronic device, the electronic device may maintain the luminance value of the AR image associated with the target device.

Figure 8:
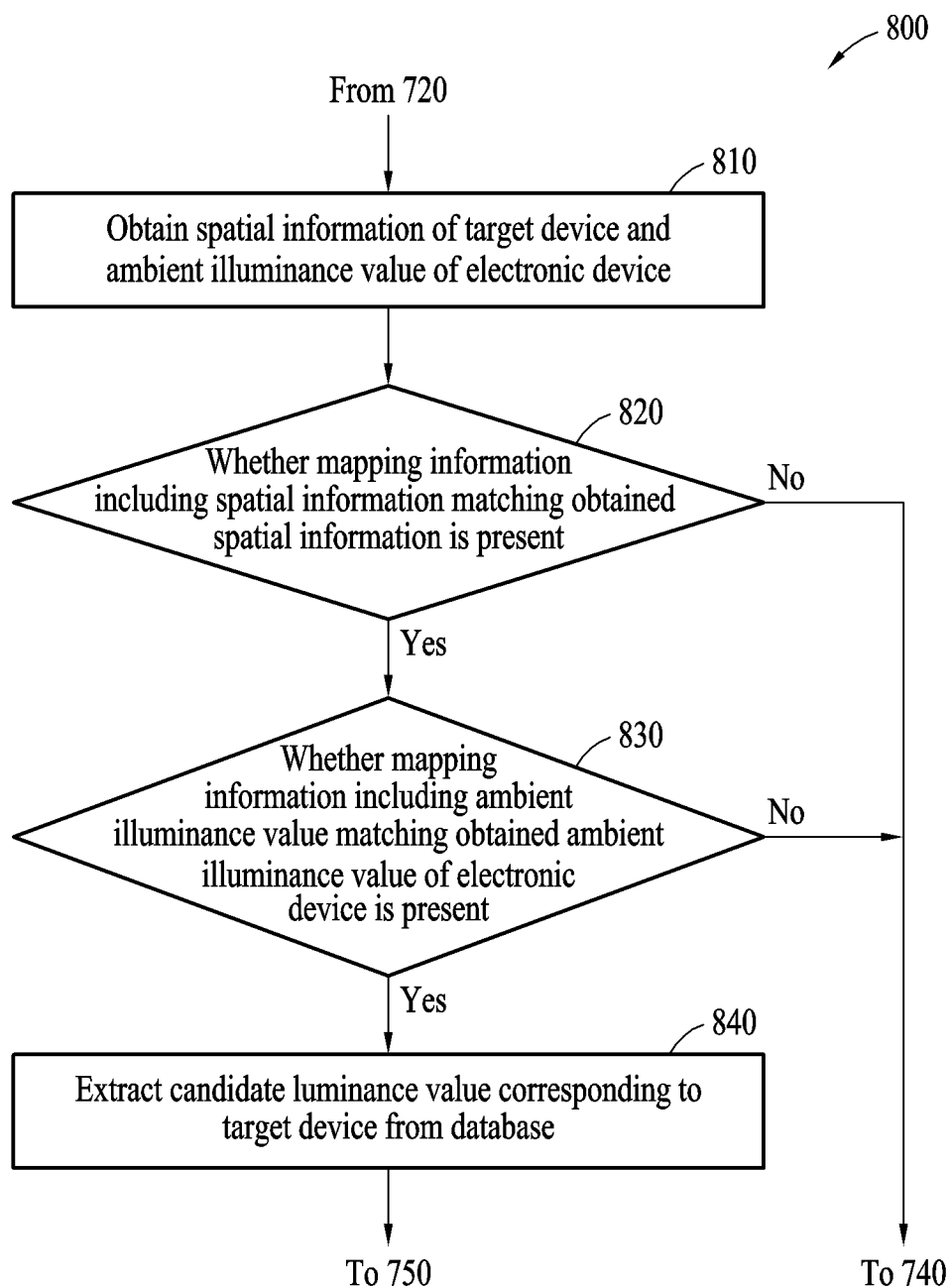
FIG. 8 is a flowchart illustrating an operation of an electronic device to search a database for a candidate luminance value corresponding to a target device, according to an embodiment.

FIG. 8 is a flowchart illustrating an operation of an electronic device to search a database for a candidate luminance value corresponding to a target device, according to an example embodiment.

The database may store mapping information by mapping spatial information and an illuminance value with one candidate luminance value. When the electronic device fails to receive luminance information from the other target device except for at least one target device among identified external devices, the electronic device may search a database for the candidate luminance value corresponding to the other target device. When the candidate luminance value corresponding to the other target device is in the database, the electronic device may extract the candidate luminance value and may determine a luminance value of an AR image associated with the other target device, based on the extracted candidate luminance value. For example, since the electronic device may not receive the luminance information from the target device that is not communicatively connected, the electronic device may search a database for a candidate luminance value corresponding to the target device that is not communicatively connected.

A flowchart 800 of FIG. 8 represents the flowchart of operation 730 of FIG. 7. Hereinafter, an operation of the electronic device (e.g., the terminal device 101 of FIG. 1 or the wearable AR device 200 of FIG. 2, the electronic device 510 of FIG. 5, or the electronic device 610 of FIG. 6) to extract the candidate luminance value from the database is described.

In operation 810, the electronic device may obtain spatial information of the other target device and an ambient illuminance value of the electronic device. For example, the electronic device may obtain the spatial information of the other target device by using at least one of a vision sensor, a light detection and ranging (Lidar) sensor, and a global positioning system (GPS) sensor. For example, the electronic device may obtain the ambient illuminance value of the electronic device through a photoresistor. The ambient illuminance value of the electronic device may be an ambient illuminance value, of the electronic device, measured when the electronic device searches the database for the candidate luminance value corresponding to the other target device.

In operation 820, the electronic device may determine whether mapping information including spatial information identical to the obtained spatial information of the other target device is present among mapping information stored in the database. When the mapping information including the spatial information identical to the spatial information of the other target device is not present in the database, the electronic device may enter a luminance setting mode.

In operation 830, the electronic device may extract the mapping information identical to the obtained spatial information of the other target device and may determine whether mapping information including the illuminance value identical to the obtained ambient illuminance value of the electronic device is present among the extracted mapping information. For example, when an error between the obtained ambient illuminance value of the electronic device and the illuminance value of the mapping information falls within a preset error range, the electronic device may determine that the illuminance values match each other.

When the mapping information including the illuminance value identical to the obtained ambient illuminance value of the electronic device is not present among the extracted mapping information, the electronic device may enter a manual setting mode.

In operation 840, when mapping information identical to both the obtained spatial information of the other target device and the ambient illuminance value of the electronic device is present in the database, the electronic device may extract a candidate luminance value included in the mapping information. The electronic device may determine the luminance value of the AR image associated with the other target device by the extracted candidate luminance value.

Figure 9:
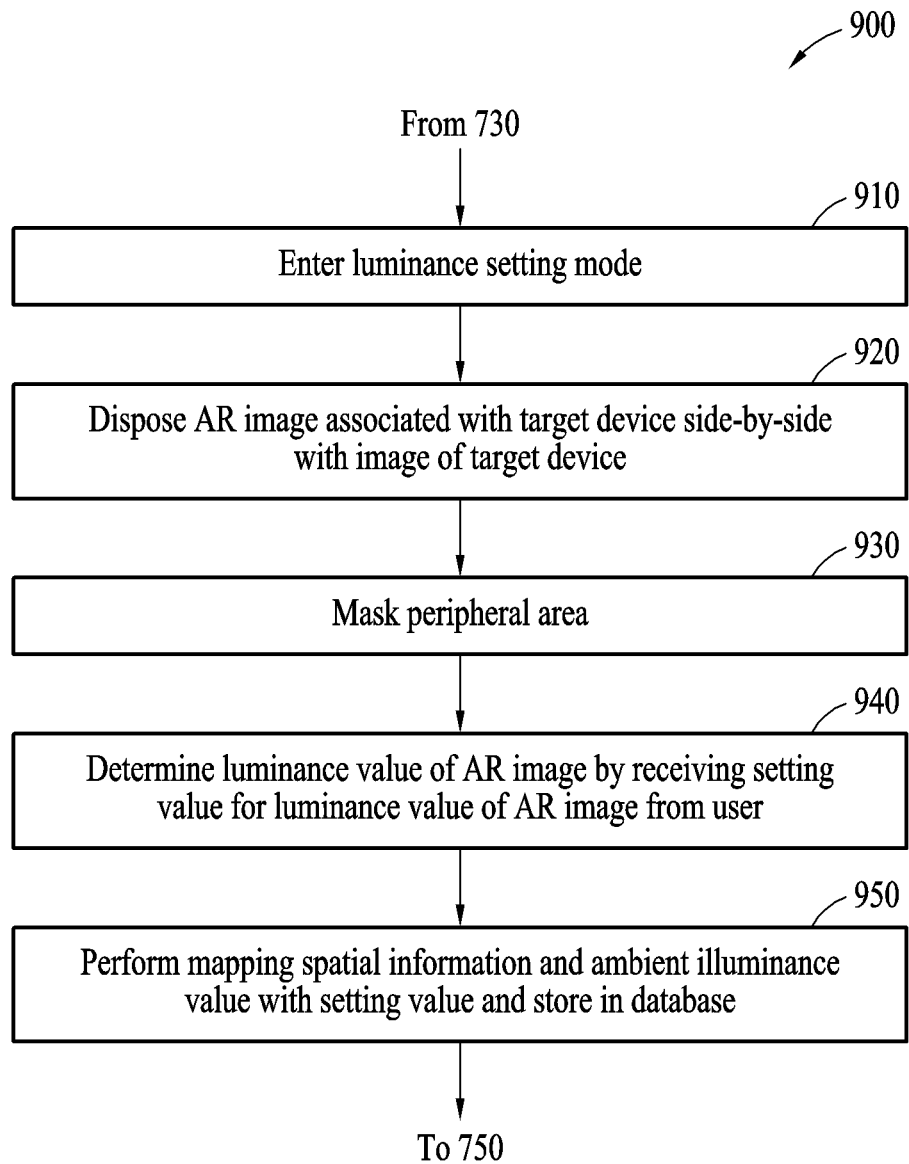
FIG. 9 is a flowchart illustrating a method of manually determining, by an electronic device, a luminance value of an AR image by receiving an input from a user, according to an embodiment.

FIG. 9 is a flowchart illustrating a method of manually determining, by an electronic device, a luminance value of an AR image by receiving an input from a user, according to an example embodiment.

In an embodiment, when an electronic device (e.g., the terminal device 101 of FIG. 1, the wearable AR device 200 of FIG. 2, the electronic device 510 of FIG. 5, or the electronic device 610 of FIG. 6) fails to receive luminance information from the other target device except for at least one target device among one or more external devices, the electronic device may enter a luminance setting mode. When the electronic device enters the luminance setting mode, the electronic device may receive a setting value for a luminance value of an AR image associated with the other target device from a user and may determine the luminance value of the AR image associated with the other target device by a luminance value, based on the received setting value. In an embodiment, a flowchart 900 of FIG. 9 may represent operation 740 of FIG. 7.

In operation 910, when the electronic device fails to receive luminance information from the other target device, the electronic device may enter the luminance setting mode. For example, when the electronic device fails to receive the luminance information from the other target device and fails to search a database for a candidate luminance value corresponding to the other target device, the electronic device may enter the luminance setting mode. However, the example of the electronic device entering the luminance setting mode is not limited to the example described above, and the electronic device may enter the luminance setting mode as the electronic device receives a separate input from the user. For example, even if the electronic device receives the luminance information from the target device, the electronic device may enter the luminance setting mode by receiving a separate input from the user.

In operation 920, when the electronic device enters the luminance setting mode, the electronic device may display, on the screen of the electronic device, an AR image associated with the other target device side-by-side with an image of the target device.

In operation 930, the electronic device may mask a peripheral area excluding an area visualizing an image of the other target device and an area displaying the AR image associated with the other target device from the total area of the screen. The electronic device may assist the user to easily compare the luminance of two images by masking the peripheral area. The electronic device may adjust a mask opacity of the peripheral area such that the peripheral area of the screen may have a luminance value equal to or less than a threshold luminance value. For example, the electronic device may adjust the mask opacity of the peripheral area of the screen to "1".

In operation 940, the electronic device may receive a setting value for the luminance value of the AR image associated with the other target device from the user. The electronic device may display the AR image associated with the other target device by the luminance value, based on the received setting value from the user. That is, the electronic device may adjust a brightness masking value of the AR image associated with the other target device by the user's manipulation and may determine the setting value received from the user by a value obtained by multiplying the adjusted brightness masking value by the maximum luminance of the electronic device. For example, the setting value, received from the user, for the luminance value of the AR image may be determined by Equation 4 shown below.

Setting value for luminance value of AR image=Maximum luminance of electronic device×brightness masking value  [Equation 4]

The electronic device may determine the luminance value of the AR image by the setting value received from the user and calculated by Equation 4.

In operation 950, the electronic device may store the setting value received from the user in the database. For example, the electronic device may determine the candidate luminance value by the setting value received from the user and may store, in the database, mapping information obtained by mapping the ambient illuminance value of the electronic device with the setting value received from the user. The ambient illuminance value of the electronic device may be an ambient illuminance value, of the electronic device, measured when the electronic device stores the setting value received from the user in the database.

Figure 10A:
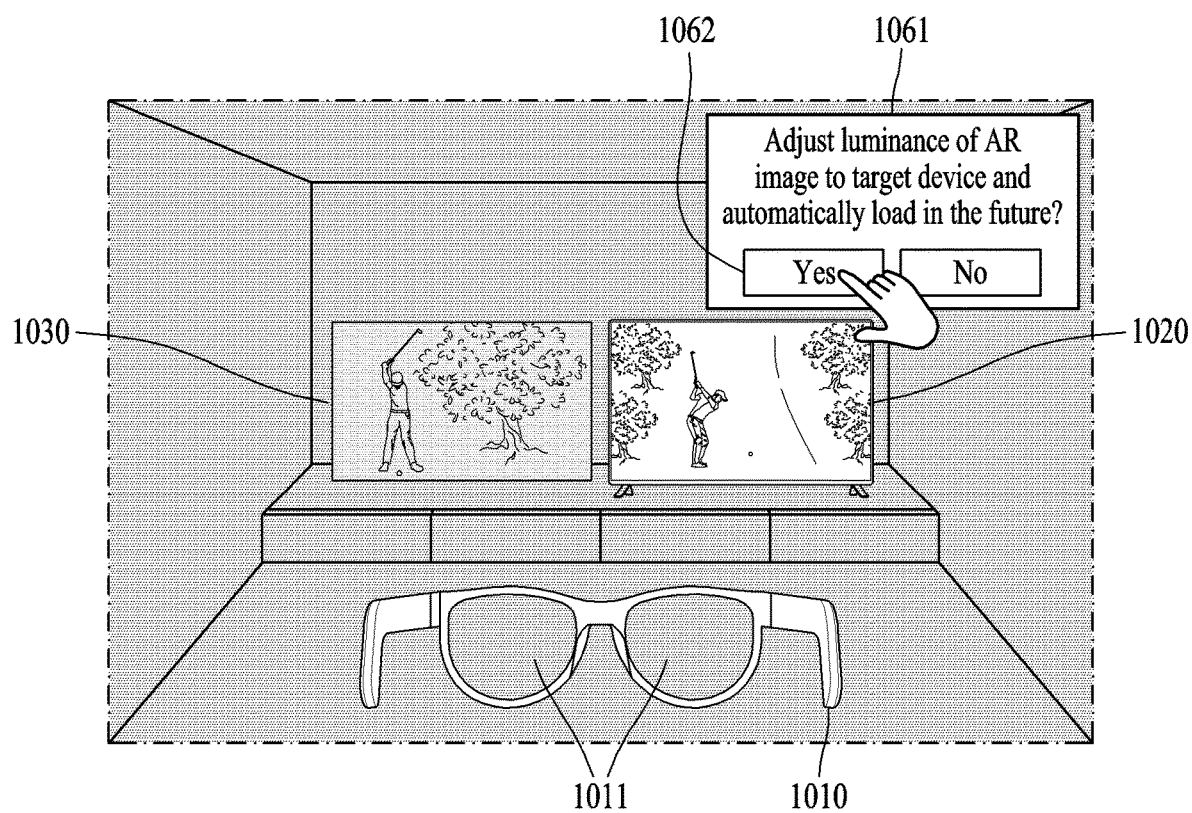
FIGS. 10A and 10B are diagrams illustrating an operation of an electronic device to receive a setting value for a luminance value of an AR image from a user, according to an embodiment.
Figure 10B:
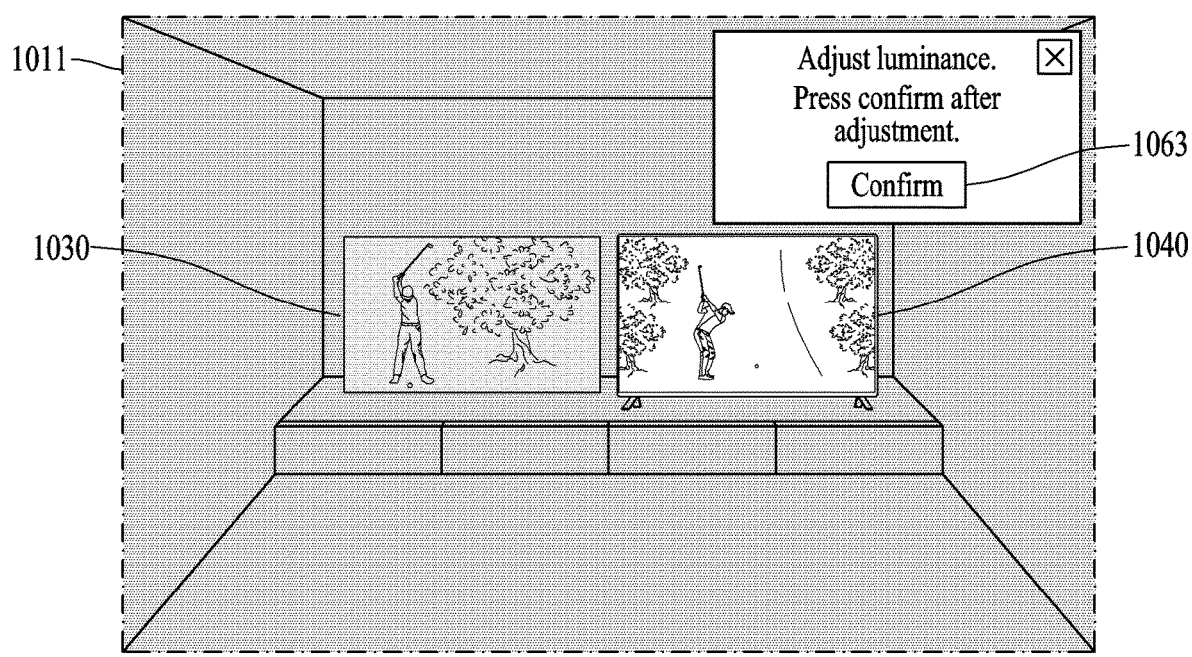

FIGS. 10A and 10B are diagrams illustrating an operation of an electronic device to receive a setting value for a luminance value of an AR image from a user, according to an example embodiment.

Referring to FIG. 10A, when an electronic device 1010 (e.g., the terminal device 101 of FIG. 1, the wearable AR device 200 of FIG. 2, the electronic device 510 of FIG. 5, or the electronic device 610 of FIG. 6) fails to receive luminance information from the other target device except for at least one target device among identified one or more external devices and fails to retrieve a candidate luminance value corresponding to the other target device from a database, the electronic device 1010 may display, on a screen 1011 of the electronic device 1010, a message 1061 for entering a luminance setting mode. For example, when the electronic device 1010 receives a selection input (e.g., a touch input) for a graphic object 1062 from a user, the electronic device 1010 may enter the luminance setting mode to receive an input for a setting value for a luminance value of an AR image 1030 associated with a target device 1020.

Referring to FIG. 10B, the electronic device 1010 may display, on the screen 1011, the AR image 1030 associated with the target device 1020 side-by-side with an image 1040 of the target device 1020. That is, the electronic device 1010 may display, on the screen 1011, the AR image 1030 associated with the target device 1020 on an area adjacent to an area where the image 1040 of the target device 1020 is visualized.

In an embodiment, the electronic device 1010 may receive a setting value for the luminance value of the AR image 1030 from the user. For example, the electronic device 1010 may recognize a hand gesture of the user and may adjust a brightness masking value of the AR image 1030, based on the hand gesture of the user. The electronic device 1010 may adjust the luminance value of the AR image 1030 that is output on the screen 1011, based on the adjusted brightness masking value. When the electronic device 1010 receives the selection input for a graphic object 1063 from the user, the electronic device 1010 may determine the setting value for the luminance value of the AR image 1030 that is input from the user by the luminance value of the AR image 1030 that is output on the screen 1011. The electronic device 1010 may determine the luminance value of the AR image 1030 by the setting value for the luminance value received from the user and may adjust a mask opacity of an AR area displaying the AR image 1030, based on the determined luminance value of the AR image 1030.

Figure 11:
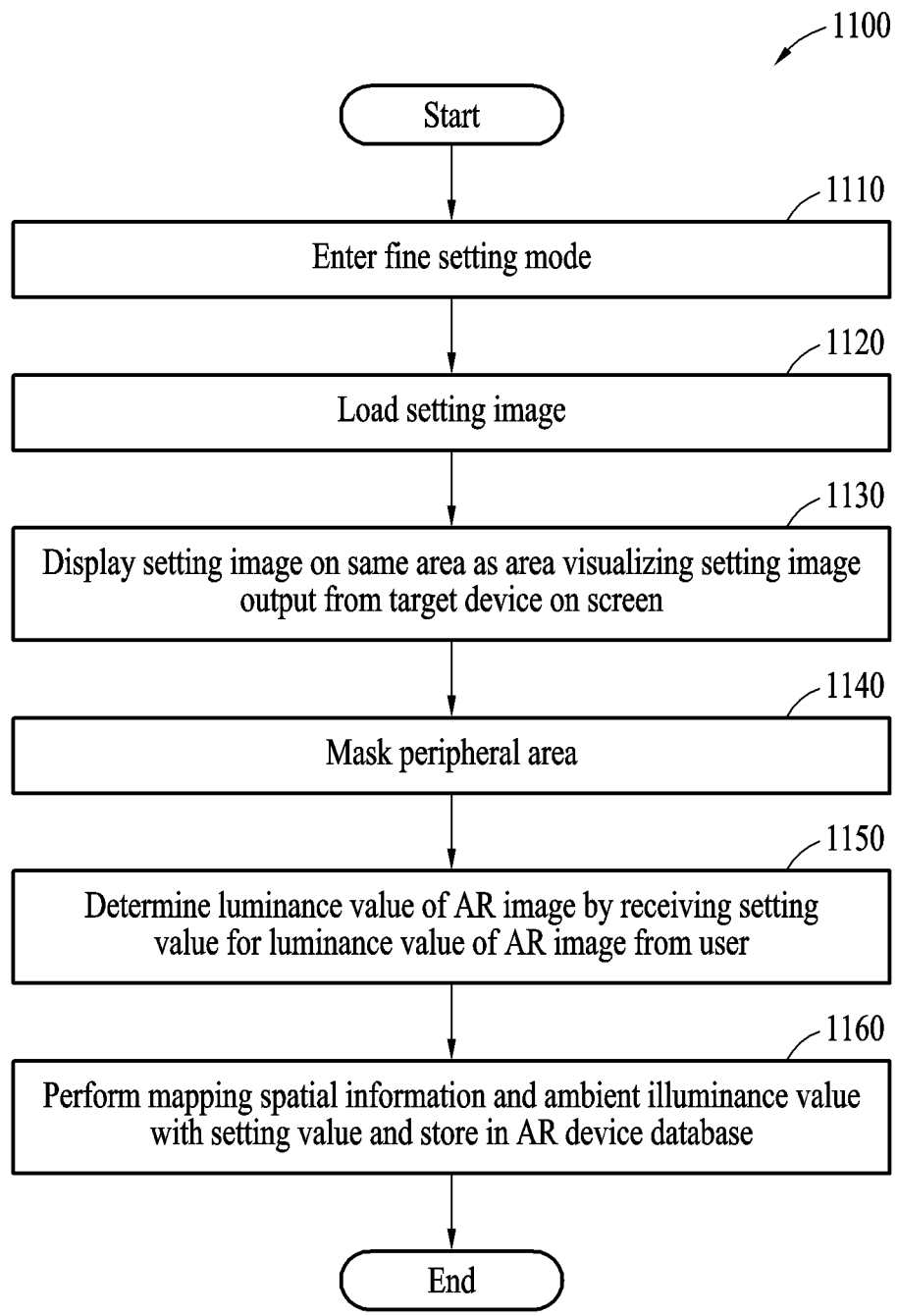
FIG. 11 is a flowchart illustrating a method of determining, by an electronic device, a luminance value of an AR image by entering a fine setting mode, according to an embodiment.

FIG. 11 is a flowchart 1100 illustrating a method of determining, by an electronic device (e.g., the terminal device 101 of FIG. 1, the wearable AR device 200 of FIG. 2, the electronic device 510 of FIG. 5, the electronic device 610 of FIG. 6, or the electronic device 1010 of FIG. 10A), a luminance value of an AR image by entering a fine setting mode, according to an example embodiment.

In an embodiment, the electronic device may determine the luminance value of the AR image by entering the fine setting mode. The electronic device may enter the fine setting mode based on a user's input with respect to a target device that may send luminance information to the electronic device and may also enter the fine setting mode based on the user's input with respect to a target device that may not send luminance information to the electronic device.

In operation 1110, the electronic device may enter the fine setting mode.

In operation 1120, the electronic device may load a setting image. The electronic device may determine the luminance value of the AR image by using the loaded setting image. The target device may receive the loaded setting image from the electronic device. For example, the target device communicatively connected to the electronic device may receive the setting image from the electronic device. As another example, the target device that is not communicatively connected to the electronic device may receive the setting image through a USB device.

In operation 1130, the electronic device may display the setting image as an AR image on an area that is the same as the area displaying the setting image output from the target device.

The target device may output the setting image. The electronic device may identify, on the screen of the electronic device, an area displaying the setting image output from the target device. The electronic device may display, in and overlapping manner, the setting image loaded on the same area as the area displaying the setting image output from the target device. Furthermore, the electronic device may display the setting image in a grid method, as described with reference to FIG. 12.

In operation 1140, the electronic device may mask a peripheral area excluding the area visualizing the setting image output from the target device and the area displaying the AR image from the total area of the screen. The electronic device may adjust a mask opacity of the peripheral area such that the peripheral area of the screen may have a luminance value equal to or less than a threshold luminance value.

In operation 1150, the electronic device may receive, from the user, a setting value for the luminance value of the AR image. The user may adjust the luminance value of the setting image displayed as the AR image in the electronic device to reduce a difference between the luminance value of the setting image displayed on the screen of the electronic device and the setting image that is output from the target device and visualized on the screen of the electronic device. Since the setting image that the electronic device displays on the screen as the AR image is the same as the setting image output from the target device, the user may easily adjust the luminance value of the AR image, based on the luminance value of the setting image output from the target device. The electronic device may determine the setting value for the luminance value of the AR image received from the user by the adjusted luminance value.

In operation 1160, the electronic device may store the setting value received from the user in the database. For example, the electronic device may determine the candidate luminance value by the setting value and may store, in the database, mapping information obtained by mapping spatial information of the target device and an ambient illuminance value of the electronic device with the setting value.

Figure 12:
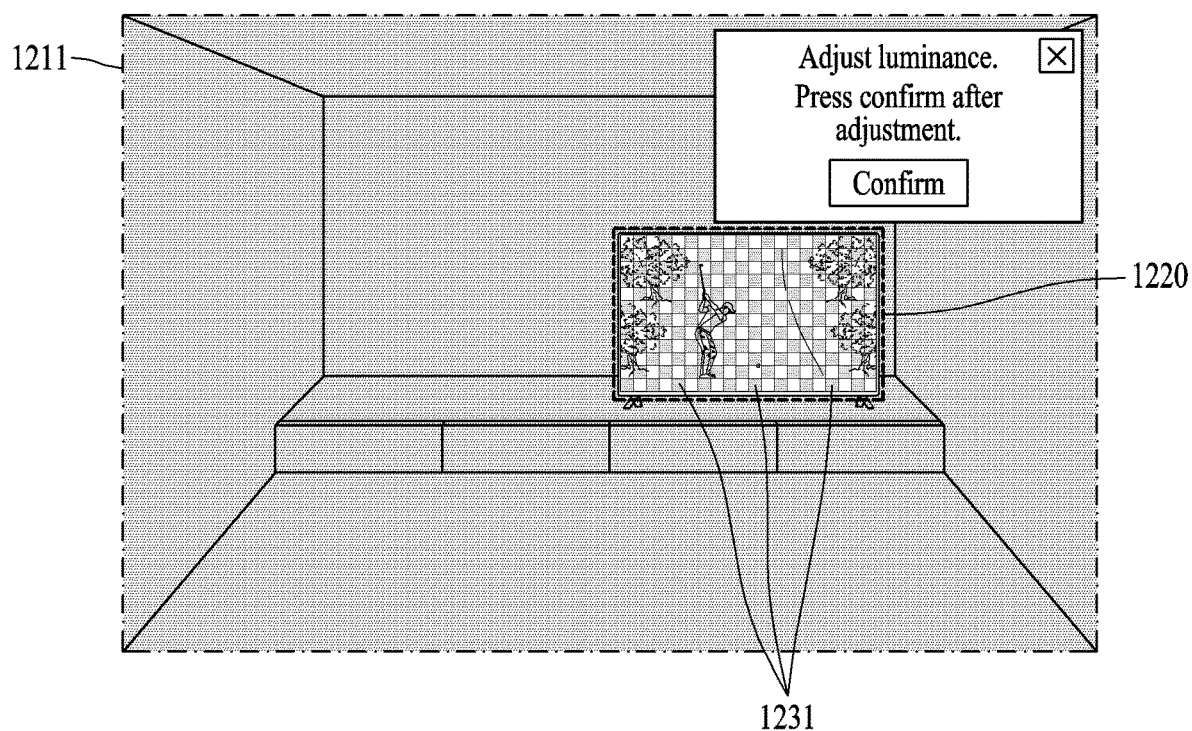
FIG. 12 is a diagram illustrating an operation of an electronic device in a fine setting mode to manually determine a luminance value of an AR image by receiving an input from a user, according to an embodiment.

FIG. 12 is a diagram illustrating an operation of an electronic device in a fine setting mode to manually determine a luminance value of an AR image by receiving an input from a user, according to an example embodiment.

In an embodiment, the electronic device (e.g., the terminal device 101 of FIG. 1, the wearable AR device 200 of FIG. 2, the electronic device 510 of FIG. 5, the electronic device 610 of FIG. 6, or the electronic device 1010 of FIG. 10A) may enter the fine setting mode based on the user's input. When the electronic device enters the fine setting mode, the electronic device may load a setting image for determining a luminance value of an AR image. In an embodiment, a target device may receive the setting image loaded by an electronic device and may output the received setting image. The electronic device may identify, on a screen 1211 of the electronic device, an area 1220 visualizing the setting image output from the target device. The electronic device may display, on the screen 1211 in an overlapping manner, the setting image as the AR image in the area 1220 visualizing the setting image output from the target device. For example, the electronic device may display the setting image at a preset initial luminance value on the area 1220. The electronic device may receive a setting value for the luminance value of the setting image, based on the user's manipulation and may determine the luminance value of the AR image associated with the target device by the luminance value, based on the received setting value.

In another embodiment, the target device may mask and output some image areas within the setting image. The target device may segment the setting image into a plurality of image areas by a plurality of unit grids and may mask and output some image areas among the plurality of segmented image areas. The screen 1211 of the electronic device may visualize the image output from the target device. The electronic device may identify an area 1231 visualizing some image areas masked from the image output from the target device and may display some image areas, masked by the target device, of the setting image on the area 1231 visualizing the masked image areas of the screen 1211 as an AR image. For example, the electronic device may display the AR image at a preset initial luminance value. In this case, since the user of the electronic device may view the AR image and the image output from the target device by the unit grid on the screen 1211, the luminance value of the AR image may be more precisely adjusted.

FIGS. 13 to 19 are diagrams illustrating an example of an electronic device for displaying an AR image associated with a target device, according to an example embodiment.

Figure 13:
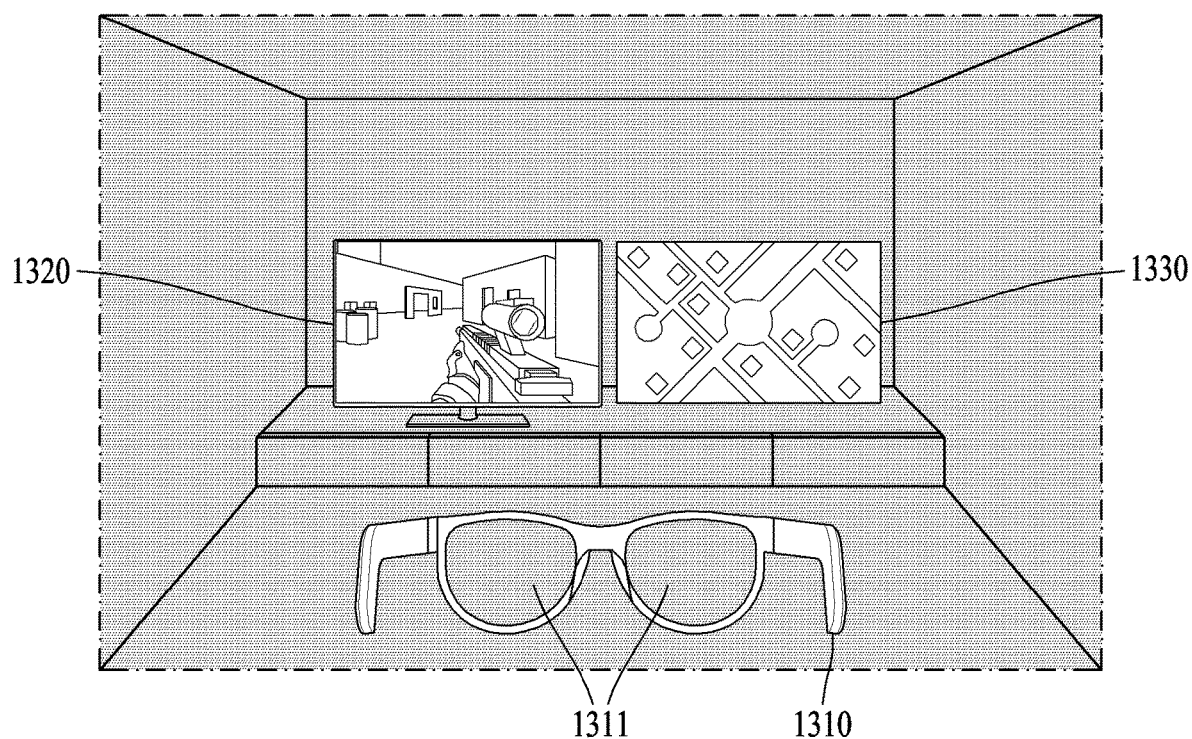
FIGS. 13 to 19 are diagrams illustrating an example of an electronic device for displaying an AR image associated with a target device, according to an embodiment.

In FIG. 13, an electronic device 1310 (e.g., the terminal device 101 of FIG. 1, the wearable AR device 200 of FIG. 2, the electronic device 510 of FIG. 5, the electronic device 610 of FIG. 6, or the electronic device 1010 of FIG. 10A)

may identify a computer 1320 as one of the external devices. The electronic device 1310 may receive luminance information of the computer 1320 from the computer 1320. The electronic device 1310 may display, on a screen 1311, an AR image 1330 corresponding to an image output from the computer 1320. The electronic device 1310 may adjust a mask opacity of an AR area displaying the AR image 1330 by determining a luminance value of the AR image 1330 by a luminance value of the computer 1320.

In addition, the electronic device 1310 may additionally receive, from the computer 1320, at least one of color sense information of the computer 1320 and information about application of a blue-light filter of the computer 1320. When the electronic device 1310 receives the color sense information from the computer 1320, the electronic device 1310 may identify the color sense of the computer 1320 and may correct the color sense of the AR area displaying the AR image 1330 to be the same as the color sense of the computer 1320. In addition, when the electronic device 1310 receives, from the computer 1320, the information about application of a blue-light filter, the electronic device 1310 may determine whether to apply the blue-light filter to the AR area displaying the AR image 1330 to be the same as the application of the blue-light filter of the computer 1320.

Figure 14:
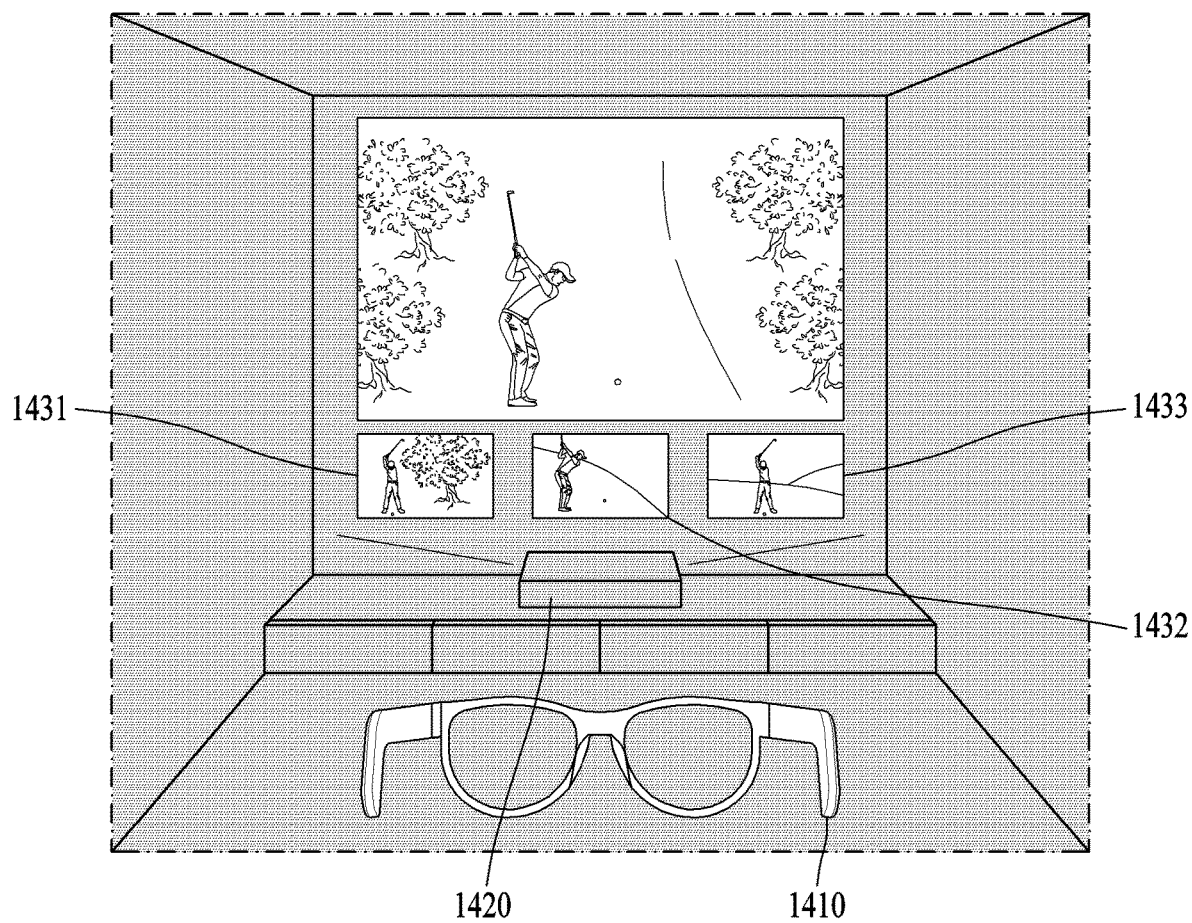

In FIG. 14, an electronic device 1410 (e.g., the terminal device 101 of FIG. 1, the wearable AR device 200 of FIG. 2, the electronic device 510 of FIG. 5, the electronic device 610 of FIG. 6, the electronic device 1010 of FIG. 10A, or the electronic device 1310 of FIG. 13) may identify a projector 1420 as one of the external devices. The electronic device 1410 may receive luminance information of the projector 1420 from the projector 1420. For example, a case is described in which the projector 1420 outputs an image related to a predetermined movie. The electronic device 1410 may display, on a screen of the electronic device 1410, a plurality of AR images 1431, 1432, and 1433 respectively corresponding to images output from the projector 1420. For example, the AR images 1431, 1432, and 1433 may respectively be preview images of the predetermined movie. The electronic device 1410 may determine luminance values of the AR images 1431, 1432, and 1433 by a luminance value of the projector 1420.

Figure 15:
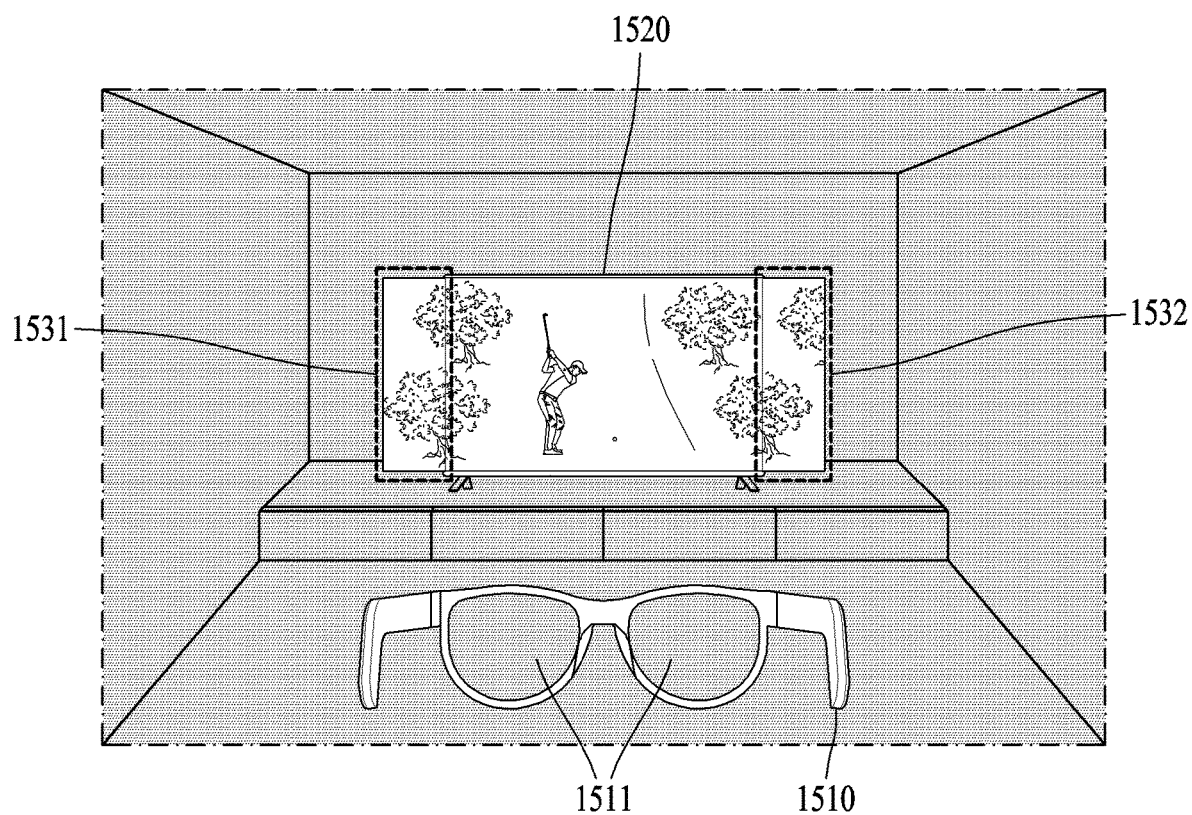

In FIG. 15, an electronic device 1510 (e.g., the terminal device 101 of FIG. 1, the wearable AR device 200 of FIG. 2, the electronic device 510 of FIG. 5, the electronic device 610 of FIG. 6, the electronic device 1010 of FIG. 10A, the electronic device 1310 of FIG. 13, or the electronic device 1410 of FIG. 14) may identify a TV 1520 as one of the external devices. The electronic device 1510 may receive luminance information of the TV 1520 from the TV 1520. In an embodiment, the electronic device 1510 may display, on a screen, AR images 1531 and 1532 respectively corresponding to images output from the TV 1520. An aspect ratio of the image output from the TV 1520 may be different from an aspect ratio of the TV 1520. For example, the aspect ratio of the image output from the TV 1520 may be 21:9, however, the aspect ratio of the TV 1520 may be 16:9. In this case, the TV 1520 may not use the full screen to output the image. A dead space may occur when the TV 1520 outputs the corresponding image. However, in an embodiment, the TV 1520 may output the image using the full screen and as the TV 1520 outputs the image using the full screen, the electronic device 1510 may output a portion, which is not output, of the image as AR images 1531 and 1532 on a screen 1511. In addition, the electronic device 1510 may determine luminance values of the AR images 1531 and 1532 by the luminance value of the TV 1520 and may adjust a mask opacity of an AR area displaying the AR images 1531 and 1532 by using the determined luminance value.

Figure 16:
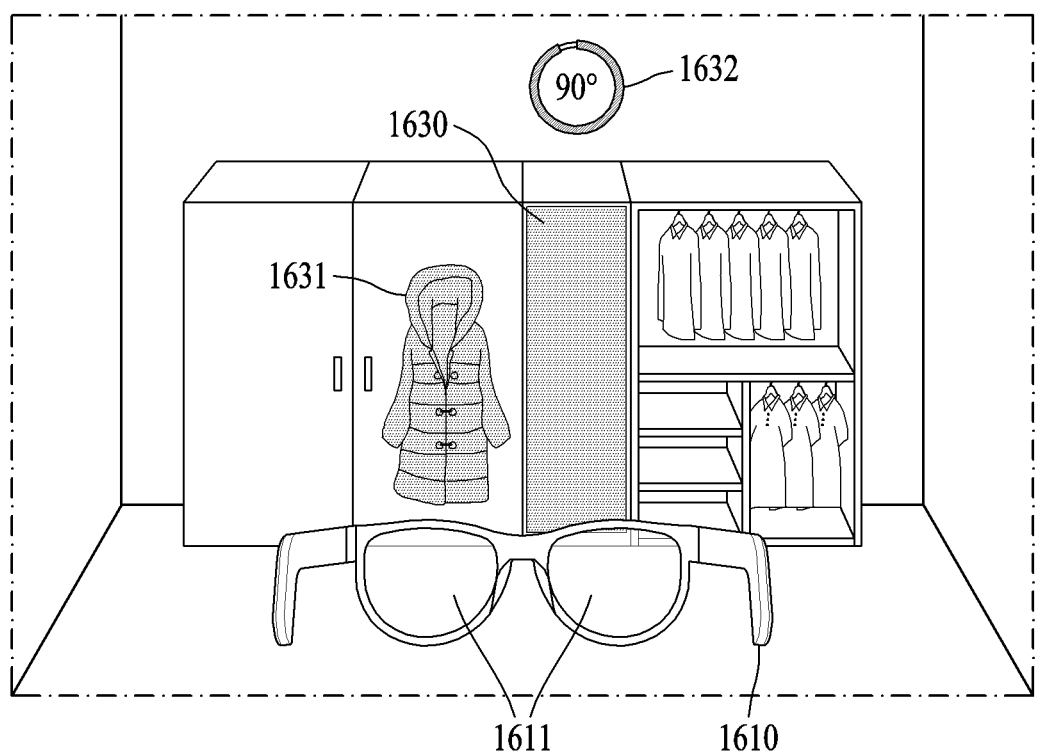

In FIG. 16, an electronic device 1610 (e.g., the terminal device 101 of FIG. 1, the wearable AR device 200 of FIG. 2, the electronic device 510 of FIG. 5, the electronic device 610 of FIG. 6, the electronic device 1010 of FIG. 10A, the electronic device 1310 of FIG. 13, the electronic device 1410 of FIG. 14, or the electronic device 1510 of FIG. 15) may identify an airdresser 1630 as one of the external devices. The electronic device 1610 may receive luminance information of the airdresser 1630 from the airdresser 1630. The electronic device 1610 may display, on a screen 1611 of the electronic device 1610, an image related to clothes being washed in the airdresser 1630 as an AR image 1631. In addition, the electronic device 1610 may display an image showing the rate of a washing progress of the airdresser 1630 as an AR image 1632 on the screen 1611. The electronic device 1610 may determine luminance values of the AR images 1631 and 1632 to be the same as the luminance value of the airdresser 1630 and may adjust a mask opacity of an AR area displaying the AR images 1631 and 1632 by using the determined luminance value.

Figure 17:
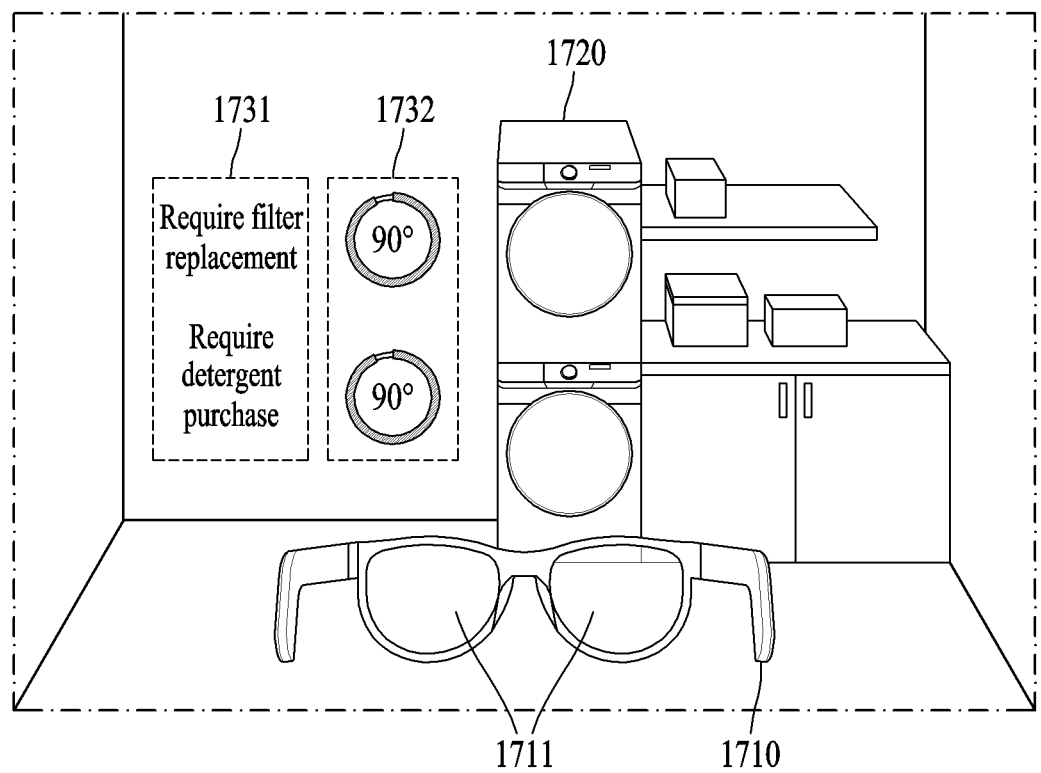

In FIG. 17, an electronic device 1710 (e.g., the terminal device 101 of FIG. 1, the wearable AR device 200 of FIG. 2, the electronic device 510 of FIG. 5, the electronic device 610 of FIG. 6, the electronic device 1010 of FIG. 10A, the electronic device 1310 of FIG. 13, the electronic device 1410 of FIG. 14, the electronic device 1510 of FIG. 15, or the electronic device 1610 of FIG. 16) may identify a washing machine 1720 as one of the external devices. The electronic device 1710 may receive luminance information of the washing machine 1720 from the washing machine 1720. The electronic device 1710 may display, on a screen 1711 of the electronic device 1710, an image related to maintenance and management of the washing machine 1720 as an AR image 1731. In addition, the electronic device 1710 may display, on the screen 1711, an image showing the rate of a washing or drying progress of the washing machine 1720 as an AR image 1732. The electronic device 1710 may determine luminance values of the AR images 1731 and 1732 to be the same as the luminance value of the washing machine 1720 and may adjust a mask opacity of an AR area displaying the AR images 1731 and 1732 by using the determined luminance value.

Figure 18:
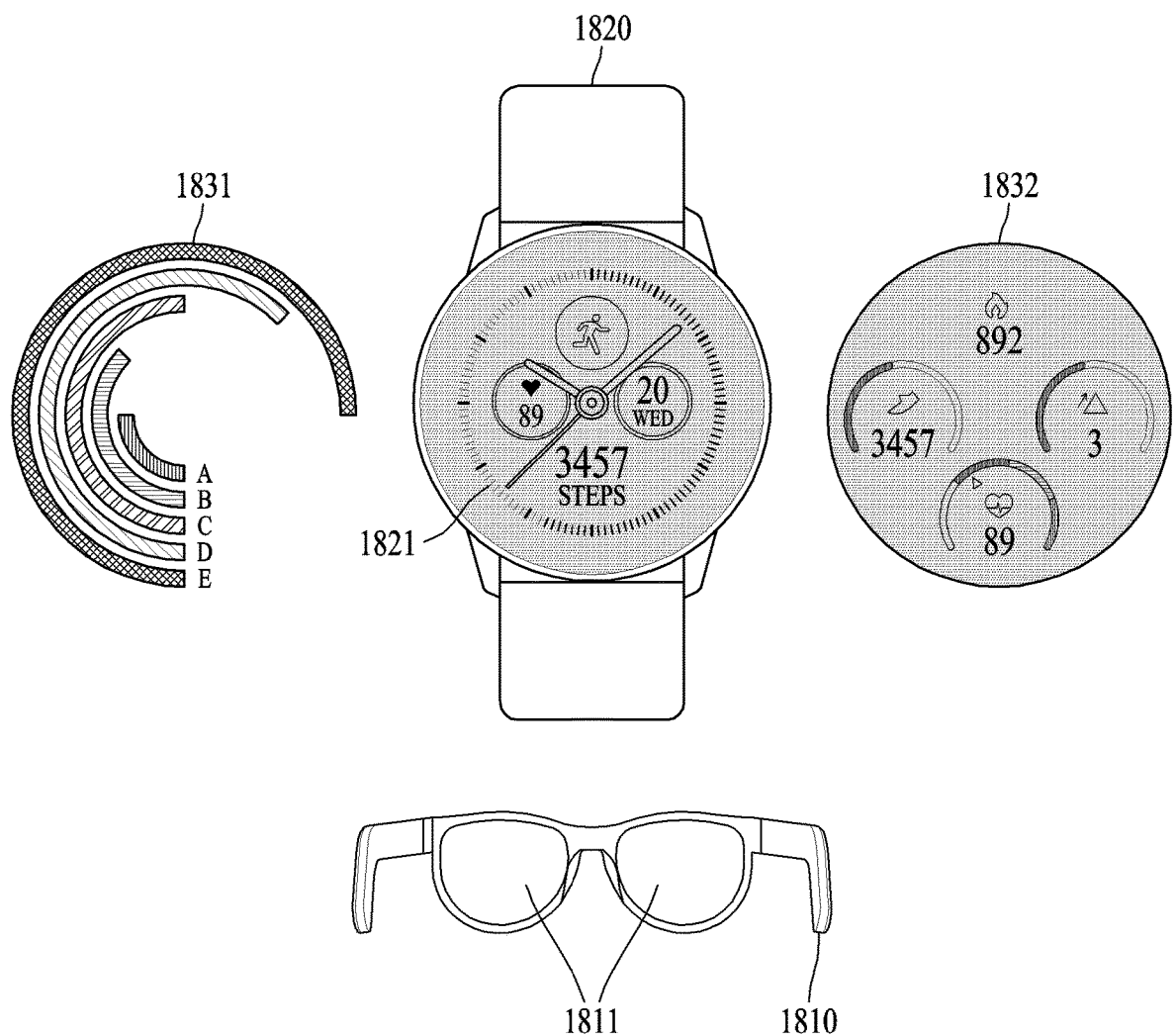

In FIG. 18, an electronic device 1810 (e.g., the terminal device 101 of FIG. 1, the wearable AR device 200 of FIG. 2, the electronic device 510 of FIG. 5, the electronic device 610 of FIG. 6, the electronic device 1010 of FIG. 10A, the electronic device 1310 of FIG. 13, the electronic device 1410 of FIG. 14, the electronic device 1510 of FIG. 15, the electronic device 1610 of FIG. 16, or the electronic device 1710 of FIG. 17) may identify a smart watch 1820 as one of the external devices. The electronic device 1810 may receive luminance information of the smart watch 1820 from the smart watch 1820. The electronic device 1810 may display, on a screen 1811 of the electronic device 1810, images showing additional information related to information displayed on a display 1821 of the smart watch 1820 as AR images 1831 and 1832. The electronic device 1810 may determine luminance values of the AR images 1831 and 1832 to be the same as the luminance value of the smart watch 1820 and may adjust a mask opacity of an AR area displaying the AR images 1831 and 1832 by using the determined luminance value.

Figure 19:
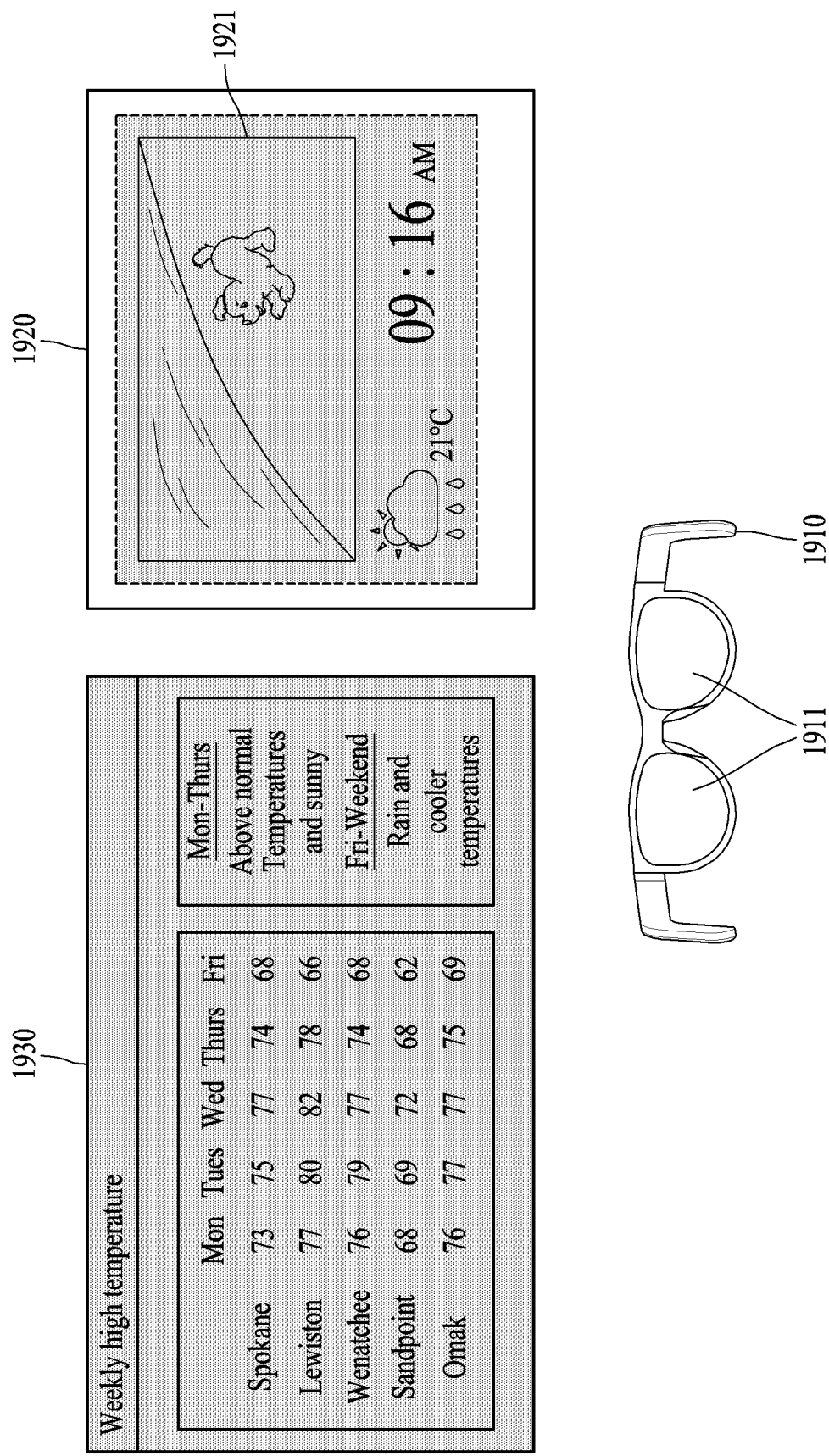

In FIG. 19, an electronic device 1910 (e.g., the terminal device 101 of FIG. 1, the wearable AR device 200 of FIG. 2, the electronic device 510 of FIG. 5, the electronic device 610 of FIG. 6, the electronic device 1010 of FIG. 10A, the electronic device 1310 of FIG. 13, the electronic device 1410 of FIG. 14, the electronic device 1510 of FIG. 15, the electronic device 1610 of FIG. 16, the electronic device 1710 of FIG. 17, or the electronic device 1810 of FIG. 18) may identify a smart mirror 1920 as one of the external devices. The electronic device 1910 may receive luminance information of the smart mirror 1920 from the smart mirror 1920. The electronic device 1910 may display, on a screen 1911 of the electronic device 1910, an image showing additional information related to information displayed on a display 1921 of the smart mirror 1920 as an AR image 1930. The electronic device 1910 may determine a luminance value of the AR image 1930 to be the same as the luminance value of the smart mirror 1920 and may adjust a mask opacity of an AR area displaying the AR image 1930 by using the determined luminance value.

Figure 20:
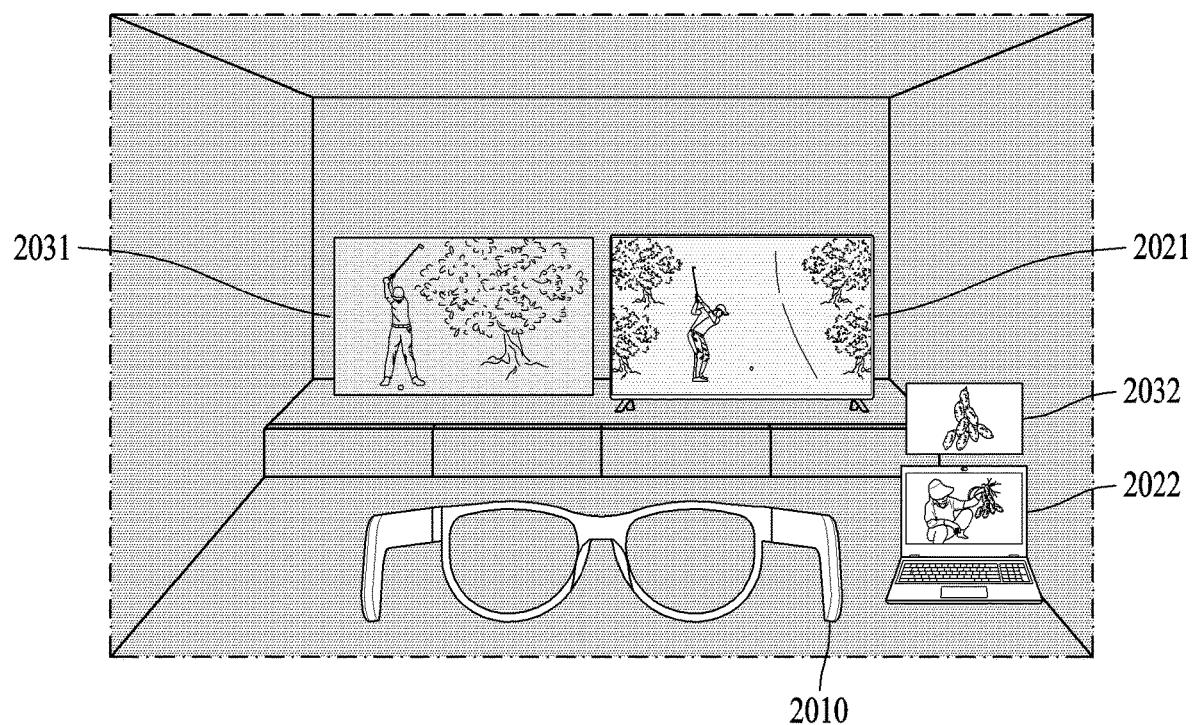
FIG. 20 is a diagram illustrating an operation of an electronic device to synchronize luminance values of AR images with luminance values of a plurality of target devices, according to an embodiment.

FIG. 20 is a diagram illustrating an operation of an electronic device to synchronize luminance values of AR images with luminance values of a plurality of target devices, according to an example embodiment.

In an embodiment, the electronic device 2010 (e.g., the terminal device 101 of FIG. 1, the wearable AR device 200 of FIG. 2, the electronic device 510 of FIG. 5, the electronic device 610 of FIG. 6, the electronic device 1010 of FIG. 10A, the electronic device 1310 of FIG. 13, the electronic device 1410 of FIG. 14, the electronic device 1510 of FIG. 15, the electronic device 1610 of FIG. 16, the electronic device 1710 of FIG. 17, the electronic device 1810 of FIG. 18, or the electronic device 1910 of FIG. 19) may identify a plurality of target devices 2021 and 2022. The electronic device may establish communication between the plurality of target devices 2021 and 2022 and may adjust luminance values of the plurality of target devices 2021 and 2022, respectively. The electronic device may enter a luminance synchronization mode based on a user's input. In an embodiment, when the electronic device enters the luminance synchronization mode, the electronic device may receive a selection input for the target device 2021 from the user. The electronic device may modify a luminance value of the other target device 2022 by the luminance value of the selected target device 2021 and may modify luminance values of AR images 2031 and 2032 respectively related to the plurality of target devices 2021 and 2022. For example, when the electronic device calculates that the luminance value of the target device 2021 is 600 nit, the electronic device may modify the luminance value of the other target device 2022 and the luminance values of the AR images 2031 and 2032 to be 600 nit. Furthermore, after synchronization, the electronic device may modify the luminance values of the target devices 2021 and 2022 and the luminance values of the AR images 2031 and 2032 at once.

According to an embodiment, an electronic device may include a memory configured to store computer-executable instructions, a processor configured to execute the instructions by accessing the memory, and a communicator configured to receive luminance information including a maximum luminance and a luminance setting value from at least one target device among one or more external devices identified by the electronic device, wherein the processor may be configured to calculate a luminance value of the at least one target device, based on the luminance information received from the at least one target device and determine a luminance value of an AR image associated with the target device, based on the luminance value of the at least one target device.

The processor may be further configured to adjust a mask opacity of an AR area displaying the AR image associated with the target device, based on the determined luminance value of the AR image associated with the target device.

The processor may be further configured to calculate a luminance limit of the at least one target device by using the luminance information received from the at least one target device and calculate the luminance value of the at least one target device, based on the luminance limit of the at least one target device and light transmittance of the electronic device.

The processor may be further configured to adjust the mask opacity of the AR area displaying the AR image associated with the target device, based on a ratio of the luminance value of the AR image associated with the target device to the maximum luminance of the electronic device.

The processor may be configured to adjust a mask opacity of a background area excluding an AR area displaying an AR image from a total area of a screen of the electronic device, based on a ratio of an ambient illuminance value of the electronic device to the maximum luminance of the electronic device.

The processor may be further configured to, when the luminance value of the AR image associated with the target device exceeds the maximum luminance of the electronic device, modify the luminance value of the AR image associated with the target device to the maximum luminance of the electronic device and when the luminance value of the AR image associated with the target device is equal to or less than the maximum luminance of the electronic device, maintain the luminance value of the AR image.

The processor may be further configured to calculate a modified luminance value of the at least one target device by receiving modified luminance information from the at least one target device and modify the luminance value of the AR image associated with the target device, based on the modified luminance value of the at least one target device.

The electronic device may further include a database configured to store a result obtained by mapping spatial information and an ambient illuminance value with a candidate luminance value, wherein the processor may be further configured to, when the electronic device fails to receive the luminance information from another target device except for the at least one target device among the one or more external devices, extract, from the database, a candidate luminance value of the other target device, based on the spatial information of the other target device and the ambient illuminance value of the electronic device, and determine a luminance value of an AR image associated with the other target device, based on the candidate luminance value of the other target device.

The processor is configured to, when the electronic device fails to receive the luminance information from another target device except for the at least one target device among the one or more external devices, receive a setting value for the luminance value of an AR image associated with the other target device and determine the luminance value of the AR image associated with the other target device by a luminance value, based on the received setting value.

The processor may be further configured to display the AR image associated with the other target device side-by-side with an image of the other target device and adjust a mask opacity of a peripheral area such that a luminance value of the peripheral area excluding an area displaying the image of the other target device and an area displaying the AR image associated with the other target device from a total area of a screen is equal to or less than a threshold luminance value.

The processor may be further configured to, when the electronic device enters a fine setting mode, load a setting image and display, on the screen of the electronic device, the loaded setting image on a same area as an area visualizing an image of a target device in an overlapping manner.

According to an embodiment, a method performed by an electronic device, the method may include receiving luminance information including a maximum luminance and a luminance setting value from at least one target device among one or more external devices identified by the electronic device, calculating a luminance value of the at least one target device, based on the luminance information received from the at least one target device, and determining a luminance value of an AR image associated with the target device, based on the luminance value of the at least one target device.

The method may further include adjusting a mask opacity of an AR area displaying the AR image associated with the target device, based on the determined luminance value of the AR image associated with the target device.

The calculating of the luminance value of the at least one target device may include calculating a luminance limit of the at least one target device by using the luminance information received from the at least one target device, and calculating the luminance value of the at least one target device, based on the luminance limit of the at least one target device and light transmittance of the electronic device.

The adjusting of the mask opacity of the AR area may include adjusting the mask opacity of the AR area displaying the AR image associated with the target device, based on a ratio of the luminance value of the AR image associated with the target device to a maximum luminance of the electronic device.

The determining of the luminance value of the AR image may include, when the luminance value of the AR image associated with the target device exceeds a maximum luminance of the electronic device, modifying the luminance value of the AR image associated with the target device to the maximum luminance of the electronic device, and when the luminance value of the AR image associated with the target device is equal to or less than the maximum luminance of the electronic device, maintaining the luminance value of the AR image.

The method may further include storing a result obtained by mapping spatial information and an ambient illuminance value with a candidate luminance value in a database, and when the electronic device fails to receive luminance information from another target device except for the at least one target device among the one or more external devices, extracting, from the database, a candidate luminance value of the other target device, based on spatial information of the other target device and the ambient illuminance value of the electronic device, and determining a luminance value of an AR image associated with the other target device, based on the candidate luminance value of the other target device.

The method may further include, when the electronic device fails to receive luminance information from another target device except for the at least one target device among the one or more external devices, receiving, from a user, a setting value for a luminance value of an AR image associated with the other target device, and determining the luminance value of the AR image associated with the other target device by a luminance value, based on the received setting value.

The receiving, from the user, the setting value for the luminance value of the AR image associated with the other target device may include displaying the AR image associated with the other target device side-by-side with an image of the other target device and adjust a mask opacity of a peripheral area such that a luminance value of the peripheral area excluding an area displaying the image of the other target device and an area displaying the AR image associated with the other target device from a total area of a screen of the electronic device is equal to or less than a threshold luminance value.

What is claimed is:

1. An electronic device comprising:
   a communicator configured to receive luminance information from at least one target device among one or more external devices identified by the electronic device, the luminance information comprising a maximum luminance of the at least one target device and a luminance setting value of the at least one target device;
   a processor; and
   memory configured to store instructions,
   wherein the instructions, when executed by the processor, cause the electronic device to:
      determine a luminance value of the at least one target device, based on the luminance information received from the at least one target device;
      determine a luminance value of an augmented reality (AR) image associated with the at least one target device, based on the luminance value of the at least one target device; and
      display the AR image at the determined luminance value of the AR image when the at least one target device displaying another image.

2. The electronic device of claim 1, wherein the instructions, when executed by the processor, cause the electronic device to:
   adjust a mask opacity of an AR area displaying the AR image associated with the at least one target device, based on the determined luminance value of the AR image associated with the at least one target device.

3. The electronic device of claim 2, wherein the instructions, when executed by the processor, cause the electronic device to:
   adjust the mask opacity of the AR area displaying the AR image associated with the at least one target device, based on a ratio of the luminance value of the AR image associated with the at least one target device to the maximum luminance of the electronic device.

4. The electronic device of claim 1, wherein the instructions, when executed by the processor, cause the electronic device to:
   determine a luminance limit of the at least one target device by using the luminance information received from the at least one target device; and
   determine the luminance value of the at least one target device, based on the luminance limit of the at least one target device and light transmittance of the electronic device.

5. The electronic device of claim 1, wherein the instructions, when executed by the processor, cause the electronic device to:
   adjust a mask opacity of a background area excluding an AR area displaying the AR image associated with the at least one target device from a total area of a screen of the electronic device, based on a ratio of an ambient illuminance value of the electronic device to the maximum luminance of the electronic device.

6. The electronic device of claim 1, wherein the instructions, when executed by the processor, cause the electronic device to:

based on the luminance value of the AR image associated with the at least one target device exceeding the maximum luminance of the electronic device, modify the luminance value of the AR image associated with the at least one target device to the maximum luminance of the electronic device; and based on the luminance value of the AR image associated with the at least one target device being equal to or less than the maximum luminance of the electronic device, maintain the luminance value of the AR image associated with the at least one target device.

7. The electronic device of claim 1, wherein the instructions, when executed by the processor, cause the electronic device to:

determine a modified luminance value of the at least one target device by receiving modified luminance information from the at least one target device; and modify the luminance value of the AR image associated with the at least one target device, based on the modified luminance value of the at least one target device.

8. The electronic device of claim 1, further comprising:

a database configured to store results obtained by mapping spatial information and ambient illuminance values with candidate luminance values, wherein the instructions, when executed by the processor, cause the electronic device to:

based on the electronic device failing to receive the luminance information from another target device except for the at least one target device from among the one or more external devices, extract, from the database, a candidate luminance value of the another target device, based on spatial information of the another target device and the ambient illuminance value of the electronic device; and determine a luminance value of another AR image associated with the another target device, based on the candidate luminance value of the another target device.

9. The electronic device of claim 1, wherein the instructions, when executed by the processor, cause the electronic device to:

based on the electronic device failing to receive the luminance information from another target device except for the at least one target device from among the one or more external devices, receive a setting value for the luminance value of another AR image associated with the another target device; and determine the luminance value of the another AR image associated with the another target device, based on the received setting value.

10. The electronic device of claim 9, wherein the instructions, when executed by the processor, cause the electronic device to:

display the another AR image associated with the another target device side-by-side with an image of the another target device; and adjust a mask opacity of a peripheral area such that a luminance value of the peripheral area, excluding a first area displaying the image of the another target device and a second area displaying the another AR image associated with the another target device from a total area of a screen, is equal to or less than a threshold luminance value.

11. The electronic device of claim 1, wherein the instructions, when executed by the processor, cause the electronic device to:

based on the electronic device entering a fine setting mode, load a setting image and display, on a screen of the electronic device, the loaded setting image on a same area as an area visualizing the image output from the at least one target device in an overlapping manner.

12. A method performed by an electronic device, the method comprising:

receiving luminance information from at least one target device from among one or more external devices identified by the electronic device, the luminance information comprising a maximum luminance of the at least one target device and a luminance setting value of the at least one target device;

determining a luminance value of the at least one target device, based on the luminance information received from the at least one target device;

determining a luminance value of an augmented reality (AR) image associated with the at least one target device, based on the luminance value of the at least one target device; and displaying the AR image at the determined luminance value of the AR image when the at least one target device displaying another image.

13. The method of claim 12, further comprising:

adjusting a mask opacity of an AR area displaying the AR image associated with the at least one target device, based on the determined luminance value of the AR image associated with the at least one target device.

14. The method of claim 13, wherein the adjusting of the mask opacity of the AR area comprises:

adjusting the mask opacity of the AR area displaying the AR image associated with the at least one target device, based on a ratio of the luminance value of the AR image associated with the at least one target device to a maximum luminance of the electronic device.

15. The method of claim 12, wherein the determining of the luminance value of the at least one target device comprises:

determining a luminance limit of the at least one target device by using the luminance information received from the at least one target device; and determining the luminance value of the at least one target device, based on the luminance limit of the at least one target device and light transmittance of the electronic device.

16. The method of claim 12, wherein the determining of the luminance value of the AR image comprises:

based on the luminance value of the AR image associated with the at least one target device exceeding a maximum luminance of the electronic device, modifying the luminance value of the AR image associated with the at least one target device to the maximum luminance of the electronic device; and based on the luminance value of the AR image associated with the at least one target device being equal to or less than the maximum luminance of the electronic device, maintaining the luminance value of the AR image associated with the at least one target device.

17. The method of claim 12, further comprising:

storing results obtained by mapping spatial information and an ambient illuminance values with candidate luminance values in a database; and based on the electronic device failing to receive luminance information from another target device except for the at least one target device from among the one or more external devices, extracting, from the database, a candidate luminance value of the another target device, based on spatial information of the another target device and the ambient illuminance value of the electronic device, and determining a luminance value of another AR image associated with the another target device, based on the candidate luminance value of the another target device.

18. The method of claim 12, further comprising:
based on the electronic device failing to receive luminance information from another target device except for the at least one target device from among the one or more external devices, receiving, from a user, a setting value for a luminance value of another AR image associated with the another target device; and
determining the luminance value of the another AR image associated with the another target device, based on the received setting value.

19. The method of claim 18, wherein the receiving of the setting value comprises:
displaying the another AR image associated with the another target device side-by-side with an image of the another target device; and
adjusting a mask opacity of a peripheral area such that a luminance value of the peripheral area, excluding a first area displaying the image of the another target device and a second area displaying the another AR image associated with the another target device from a total area of a screen of the electronic device, is equal to or less than a threshold luminance value.

20. A non-transitory computer-readable storage medium storing instructions that, when executed by a processor, cause the processor to perform the method of claim 12.

* * * * *